(12) United States Patent
Lee et al.

(10) Patent No.: US 10,862,164 B2
(45) Date of Patent: Dec. 8, 2020

(54) POLYMER ELECTROLYTE, METHOD OF PREPARING THE POLYMER ELECTROLYTE, AND LITHIUM METAL BATTERY INCLUDING THE SAME

(71) Applicants: SAMSUNG ELECTRONICS CO., LTD., Suwon-si (KR); Samsung SDI Co., Ltd., Yongin-si (KR)

(72) Inventors: Myungjin Lee, Seoul (KR); Kihyun Kim, Seoul (KR); Taehwan Yu, Seongnam-si (KR); Wonseok Chang, Seoul (KR)

(73) Assignees: SAMSUNG ELECTRONICS CO., LTD., Gyeonggi-Do (KR); SAMSUNG SDI CO., LTD., Gyeonggi-Do (KR)

( * ) Notice: Subject to any disclaimer, the term of this patent is extended or adjusted under 35 U.S.C. 154(b) by 336 days.

(21) Appl. No.: 15/624,226

(22) Filed: Jun. 15, 2017

(65) Prior Publication Data

US 2017/0373347 A1 Dec. 28, 2017

(30) Foreign Application Priority Data

Jun. 24, 2016 (KR) ........................ 10-2016-0079290

(51) Int. Cl.
*H01M 10/0565* (2010.01)
*C08F 222/10* (2006.01)
(Continued)

(52) U.S. Cl.
CPC ... *H01M 10/0565* (2013.01); *C08F 222/1006* (2013.01); *C08G 65/007* (2013.01);
(Continued)

(58) Field of Classification Search
CPC ......... H01M 10/0565; H01M 10/0525; H01M 4/134; H01M 4/382; H01M 10/052;
(Continued)

(56) References Cited

U.S. PATENT DOCUMENTS 5,698,138 A 12/1997 Visca et al.
7,435,495 B2 10/2008 DeSimone et al.
(Continued)

FOREIGN PATENT DOCUMENTS

| JP | 4314493 B2 | 8/2009 |
| JP | 4501963 B2 | 7/2010 |
| KR | 1020050074431 A | 7/2005 |
| KR | 1020150048739 A | 5/2015 |
| WO | WO 2014/062898 | * 4/2014 |

OTHER PUBLICATIONS

Wang et all, "Nonflammable perfluoropolyether-based electrolytes for lithium batteries", PNAS, 2014, 11,3227 (Year: 2014).*
(Continued)

*Primary Examiner* — Alexander Usyatinsky
(74) *Attorney, Agent, or Firm* — Cantor Colburn LLP

(57) ABSTRACT

A polymer electrolyte including a polymerization product of a polymer having an unsaturated functional group at a terminal thereof and a fluoroalkylene chain, and an ion-conductive polymer having an unsaturated functional group at a terminal thereof, wherein the ion-conductive polymer having an unsaturated functional group at a terminal thereof is a polymer represented by Formula 1 or Formula 2, and the polymer having an unsaturated functional group at a terminal thereof and a fluoroalkylene chain is a compound represented by Formula 3, wherein Formulae 1 to 3 are the same as represented in the detailed description of the specification.

24 Claims, 10 Drawing Sheets

(51) Int. Cl.
*C08L 33/16* (2006.01)
*C08G 65/00* (2006.01)
*H01M 4/38* (2006.01)
*H01M 4/134* (2010.01)
*H01M 10/052* (2010.01)
*C08G 65/329* (2006.01)
*C08K 5/435* (2006.01)
*H01M 10/0525* (2010.01)
*H01M 4/36* (2006.01)

(52) U.S. Cl.
CPC ............ *C08G 65/329* (2013.01); *C08K 5/435* (2013.01); *C08L 33/16* (2013.01); *H01M 4/134* (2013.01); *H01M 4/382* (2013.01); *H01M 10/052* (2013.01); *H01M 10/0525* (2013.01); *C08F 222/102* (2020.02); *C08F 222/104* (2020.02); *C08K 2201/001* (2013.01); *H01M 4/366* (2013.01); *H01M 2300/0082* (2013.01); *H01M 2300/0085* (2013.01)

(58) Field of Classification Search
CPC ......... H01M 2300/0085; H01M 4/366; H01M 2300/0082; C08F 222/10; C08F 222/1006; C08F 2222/104; C08F 2222/1013; C08K 5/435; C08K 2201/001; C08G 65/329; C08G 65/007; C08L 33/16
See application file for complete search history.

(56) References Cited

U.S. PATENT DOCUMENTS

| | | | |
|---|---|---|---|
| 7,838,616 B2 | 11/2010 | Fukushima et al. | |
| 10,468,732 B2 | 11/2019 | Kim et al. | |
| 2002/0009649 A1 | 1/2002 | Sato et al. | |
| 2002/0138972 A1* | 10/2002 | Park | H01M 4/134 29/623.4 |
| 2007/0122540 A1 | 5/2007 | Salamone et al. | |
| 2009/0004568 A1* | 1/2009 | Hirose | H01M 4/626 429/221 |
| 2014/0060859 A1* | 3/2014 | Kountz | H01M 2/20 169/46 |
| 2014/0186724 A1 | 7/2014 | Hammond et al. | |
| 2015/0288028 A1* | 10/2015 | DeSimone | H01M 10/054 429/402 |
| 2015/0349365 A1* | 12/2015 | Lee | H01M 8/102 429/492 |

OTHER PUBLICATIONS

Xiao et al. Journal of Membrane Science 334 (2009) 117-122 (Year: 2009).*

Extended European Search Report dated Sep. 7, 2017, issued by the European Patent Office for European Patent Application No. 17175590.3-1360.

* cited by examiner

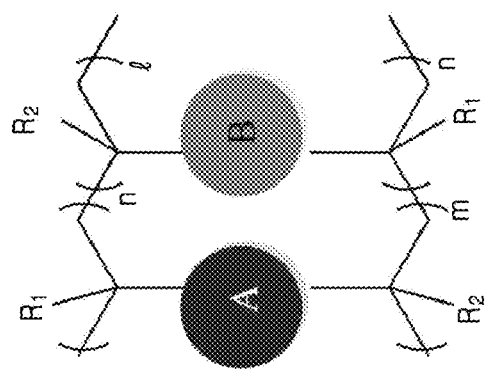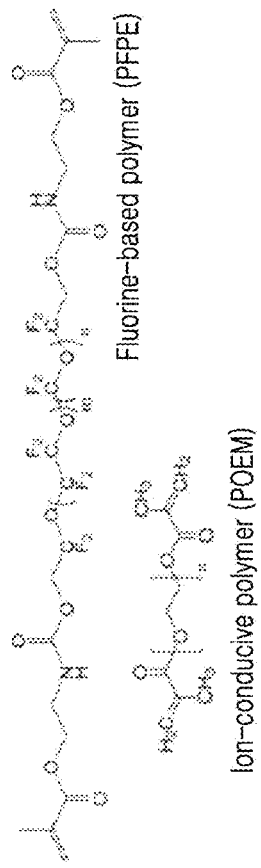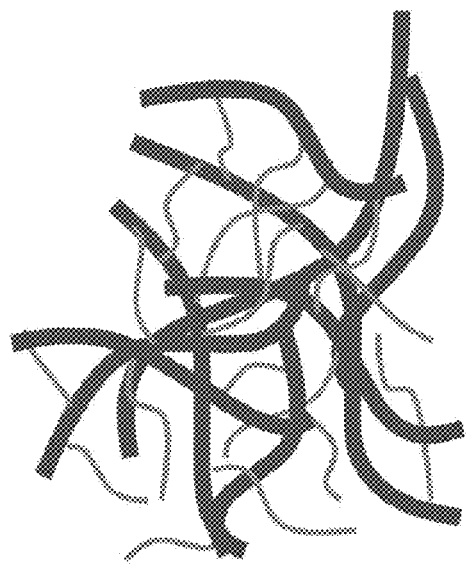

POLYMER ELECTROLYTE, METHOD OF PREPARING THE POLYMER ELECTROLYTE, AND LITHIUM METAL BATTERY INCLUDING THE SAME

CROSS-REFERENCE TO RELATED APPLICATION

This application claims priority to Korean Patent Application No. 10-2016-0079290, filed on Jun. 24, 2016, in the Korean Intellectual Property Office, and all the benefits accruing therefrom under 35 U.S.C. § 119, the content of which is incorporated herein in its entirety by reference.

BACKGROUND

1. Field

The present disclosure relates to a polymer electrolyte, a method of preparing the polymer electrolyte, and a lithium metal battery including the polymer electrolyte.

2. Description of the Related Art

Lithium secondary batteries are high-performance batteries having the highest energy density among other currently available secondary batteries, which are applicable in various fields such as electric vehicles.

A lithium secondary battery may use a lithium metal thin film as a negative electrode. When a lithium metal thin film is used as the negative electrode, the negative electrode may be highly reactive towards a liquid electrolyte during charging or discharging due to the high reactivity of lithium, or may lead to a dendritic growth on the negative electrode. Accordingly, a lithium secondary battery including such a lithium metal thin film may have reduced lifetime and stability. Therefore, there is a need for a stable lithium battery having improved functional characteristics.

SUMMARY

Provided are a polymer electrolyte with improved lithium transference number and improved mechanical characteristics, and a method of preparing the polymer electrolyte.

Provided is a lithium metal battery with improved cell performance, which includes the polymer electrolyte.

Provided is a method of preparing the polymer electrolyte.

Additional aspects will be set forth in part in the description which follows and, in part, will be apparent from the description, or may be learned by practice of the presented embodiments.

According to an aspect of an embodiment, a polymer electrolyte includes a polymerization product of:

a polymer having an unsaturated functional group at a terminal thereof and a fluoroalkylene chain, and an ion-conductive polymer having an unsaturated functional group at a terminal thereof, wherein the ion-conductive polymer having an unsaturated functional group at a terminal thereof is a polymer represented by Formula 1 or Formula 2, and wherein the polymer having an unsaturated functional group at a terminal thereof and a fluoroalkylene chain is a compound represented by Formula 3:

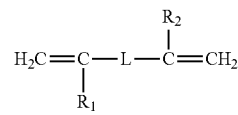

Formula 1 wherein, in Formula 1, $R_1$ and $R_2$ are each independently a hydrogen or a C1-C5 alkyl group, and L is one selected from groups represented by Formula 1a,

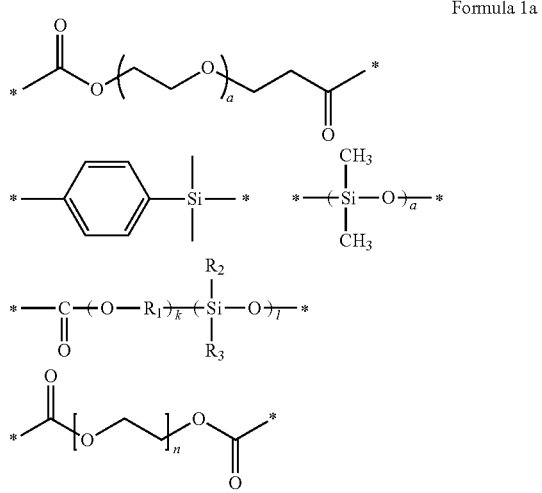

Formula 1a wherein, in Formula 1a, $R_1$ is a C1-C5 alkylene group, $R_2$ and $R_3$ are each independently a C1-C5 alkyl group, a is an integer from 1 to 10, k is an integer from 1 to 10, l is an integer from 1 to 10, n is an integer from 1 to 10, and

* denotes a binding site to a neighboring atom,

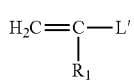

Formula 2 wherein, in Formula 2, $R_1$ is a hydrogen or a C1-C5 alkyl group, and

L' is one selected from groups represented by Formula 2a,

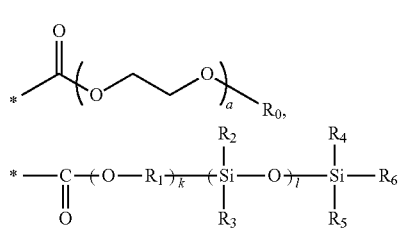

Formula 2a wherein, in Formula 2a, a is an integer from 1 to 10, $R_1$ is a C1-C5 alkylene group, $R_0$ and $R_2$ to $R_6$ are each independently a C1-C10 alkyl group, a C6-C10 aryl group, or a C1-C10 heteroaryl group, k is an integer from 1 to 10, l is an integer from 1 to 10, and

* denotes a binding site to a neighboring atom,

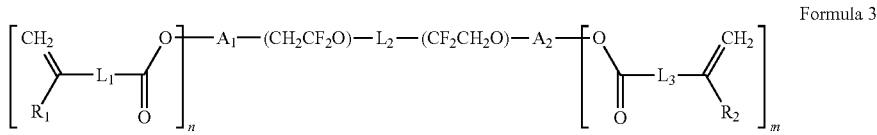

Formula 3 wherein, in Formula 3, $L_1$ and $L_3$ are each independently a bond or —C(=O)O—R—NH—, wherein R is a divalent, trivalent or tetravalent group and selected from a C1-C20 aliphatic hydrocarbon group, a C5-C40 cycloaliphatic group, a C5-C40 cycloaliphatic urethane group, a C6-C40 aryl group, and a C2-C40 heteroaryl group, $A_1$ and $A_2$ are each independently a bond or a divalent, trivalent or tetravalent bonding group, $L_2$ is a fluoropolyalkylene oxide chain or a perfluoropolyalkylene oxide chain, $R_1$ and $R_2$ are each independently a hydrogen or a C1-C5 alkyl group, and n and m are each independently an integer from 1 to 3.

According to an aspect of another embodiment, a lithium metal battery includes:

a positive electrode;

a negative electrode including a lithium metal or a lithium metal alloy; and the above polymer electrolyte.

According to an aspect of another embodiments, a method of preparing a polymer electrolyte includes:

polymerizing a mixture of a polymer having an unsaturated functional group at a terminal thereof and a fluoroalkylene chain, and an ion-conductive polymer having an unsaturated functional group at a terminal thereof, wherein the ion-conductive polymer having an unsaturated functional group at a terminal thereof is a polymer represented by Formula 1 or Formula 2, and wherein the polymer having an unsaturated functional group at a terminal thereof and a fluoroalkylene chain is a compound represented by Formula 3:

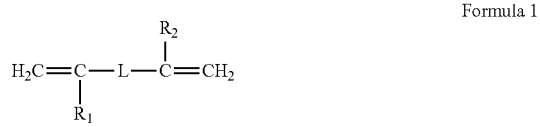

Formula 1 wherein, in Formula 1, $R_1$ and $R_2$ are each independently a hydrogen or a C1-C5 alkyl group, and L is one selected from groups represented by Formula 1a, Formula 1a

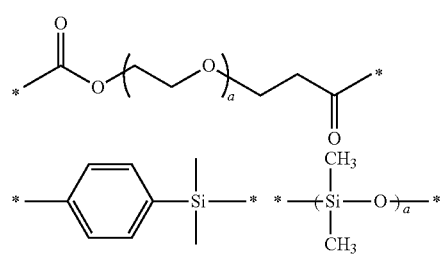

-continued

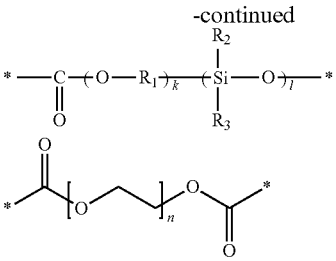

wherein, in Formula 1a, $R_1$ is a C1-C5 alkylene group, $R_2$ and $R_3$ are each independently a C1-C5 alkyl group, a is an integer from 1 to 10, k is an integer from 1 to 10, l is an integer from 1 to 10, n is an integer from 1 to 10, and

* denotes a binding site to a neighboring atom,

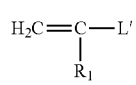

Formula 2 wherein, in Formula 2, $R_1$ is a hydrogen or a C1-C5 alkyl group, and

L' is one selected from groups represented by Formula 2a,

Formula 2a

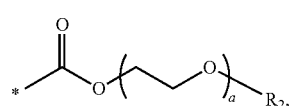

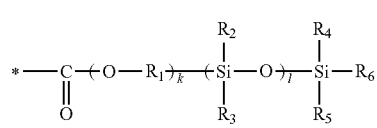

wherein, in Formula 2a, a is an integer from 1 to 10, $R_1$ is a C1-C5 alkylene group, $R_0$, and $R_2$ to $R_6$ are each independently a C1-C10 alkyl group, a C6-C10 aryl group, or a C1-C10 heteroaryl group, k is an integer from 1 to 10, l is an integer from 1 to 10, and

* denotes a binding site to a neighboring atom,

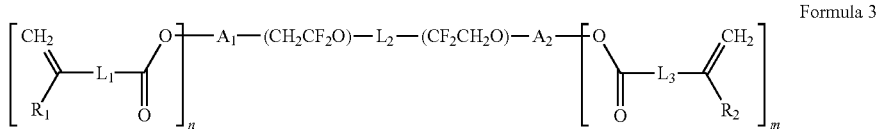

Formula 3 wherein, in Formula 3, $L_1$ and $L_3$ are each independently a bond or —C(=O)O—R—NH—, wherein R is a divalent, trivalent or tetravalent group and selected from a C1-C20 aliphatic hydrocarbon group, a C5-C40 cycloaliphatic group, a C5-C40 cycloaliphatic urethane group, a C6-C40 aryl group, and a C2-C40 heteroaryl group, $A_1$ and $A_2$ are each independently a bond or a divalent, trivalent or tetravalent bonding group, $L_2$ is a fluoropolyalkylene oxide chain or a perfluoropolyalkylene oxide chain, $R_1$ and $R_2$ are each independently a hydrogen or a C1-C5 alkyl group, and n and m are each independently an integer from 1 to 3.

BRIEF DESCRIPTION OF THE DRAWINGS

These and/or other aspects will become apparent and more readily appreciated from the following description of the embodiments, taken in conjunction with the accompanying drawings in which:

FIG. 1A to FIG. 1C are schematic views illustrating a structure of polymers forming a polymer electrolyte according to an embodiment;

DETAILED DESCRIPTION

Figure 2:
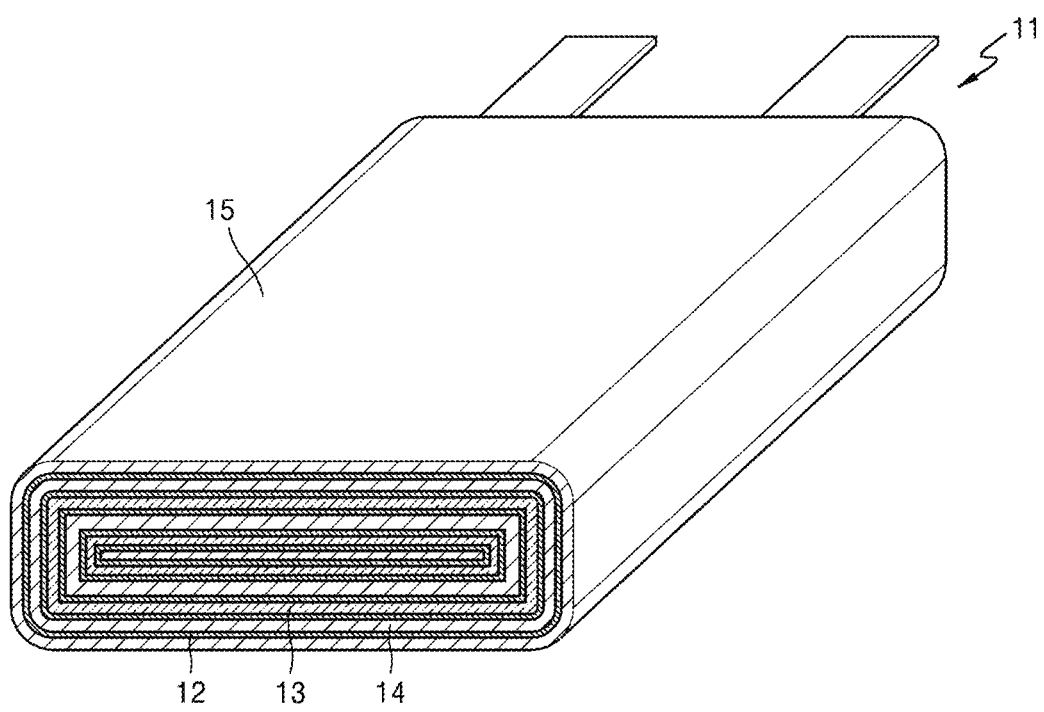
FIG. 2 is a schematic view illustrating a structure of a lithium metal battery according to an embodiment.

Reference will now be made in detail to embodiments of a polymer electrolyte, a method of preparing the polymer electrolyte, and a lithium metal battery including the polymer electrolyte, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present disclosure. As used herein, the term "and/or" includes any and all combinations of one or more of the associated listed items. Expressions such as "at least one of," when preceding a list of elements, modify the entire list of elements and do not modify the individual elements of the list.

As used herein, "mixture" is inclusive of all types of combinations, including blends, alloys, solutions, and the like.

As used herein, "C-rate" refers to a cell discharge rate that is obtained by dividing a total capacity of a cell by a total discharge time when the total capacity of the cell is regarded as 1.

As used herein, the term "alkyl group" refers to a group derived from a straight or branched chain saturated aliphatic hydrocarbon having the specified number of carbon atoms and having a valence of at least one.

As used herein, the term "alkylene group" refers to a straight or branched saturated aliphatic hydrocarbon group having a valence of at least two, optionally substituted with one or more substituents where indicated, provided that the valence of the alkylene group is not exceeded. Each alkylene group may include 1 to 8 carbon atoms, for example, 2 to 4 carbon atoms, for example, 2 to 3 carbon atoms.

As used herein, the term "aryl group", which is used alone or in combination, refers to an aromatic hydrocarbon group containing at least one ring and having the specified number of carbon atoms. The term "aryl group" may be construed as including a group with an aromatic ring fused to at least one cycloalkyl ring.

As used herein, the term "heteroaryl group" refers to an aryl group including carbon and 1 to 3 heteroatoms selected from the group consisting of N, O, S, and P as ring atoms.

As used herein, when a definition is not otherwise provided, the term "substituted" refers to replacement of a hydrogen atom of a compound or a functional group by a substituent selected from a halogen atom (F, Br, Cl, or I), a hydroxy group, a C1 to C6 alkoxy group, a cyano group, a nitro group (—NO$_2$), an amino group (—NRR', wherein R and R' are independently hydrogen or a C1 to C6 alkyl group), a C2 to C7 ester group, a C1 to C6 alkyl group, a C6 to C12 aryl group, a C3 to C9 heteroaryl group, an azido group (—N$_3$), an amidino group (—C(=NH)NH$_2$), a hydrazino group (—NHNH$_2$), a hydrazono group (=N(NH$_2$), an aldehyde group (—C(=O)H), a carbamoyl group (—C(O)NH$_2$), a thiol group (—SH), a carboxylic acid group (—COOH) or a salt thereof (—C(=O)OM, wherein M is an organic or inorganic cation), a sulfonic acid group (—SO$_3$H) or a salt thereof (—SO$_3$M, wherein M is an organic or inorganic cation), a phosphoric acid group (—PO$_3$H$_2$) or a salt thereof ($-PO_3MH$ or $-PO_3M_2$, wherein M is an organic or inorganic cation), and a combination thereof.

When a group containing a specified number of carbon atoms is substituted with any of the groups listed in the preceding paragraph, the number of carbon atoms in the resulting "substituted" group is defined as the sum of the carbon atoms contained in the original (unsubstituted) group and the carbon atoms (if any) contained in the substituent. For example, when the term "substituted C1 to C6 alkyl" refers to a C1 to C6 alkyl group substituted with C6 to C12 aryl group, the total number of carbon atoms in the resulting aryl substituted alkyl group is C7 to C18.

According to an aspect of the present disclosure, a polymer electrolyte includes a polymerization product of:

a polymer having an unsaturated functional group at a terminal thereof and a fluoroalkylene chain, and an ion-conductive polymer having an unsaturated functional group at a terminal thereof.

As used herein, the term "polymerization product" may mean a reaction product of polymerization reactions, cross-linking reactions, and graft copolymerization reactions between unsaturated bonds of an unsaturated functional group. For example, the polymerization product may include a random copolymer, an alternating copolymer, a graft copolymer, a crosslinked copolymer, and the like.

As used herein, the term "unsaturated functional group" may mean a functional group with an unsaturated bond, the term "fluoroalkylene chain" may mean an alkylene group as defined above which is partially substituted with fluorine atom(s), and the term "perfluoroalkylene chain" may mean an alkylene group as defined above which is fully substituted with fluorine atom(s).

The ion-conductive polymer having an unsaturated functional group at a terminal thereof may be a polymer represented by Formula 1 or Formula 2. The polymer represented by Formula 1 may have unsaturated functional groups at both opposite terminal ends thereof. The polymer represented by Formula 2 may have an unsaturated functional group at only one terminal end thereof.

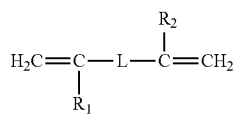

Formula 1

In Formula 1, $R_1$ and $R_2$ may be each independently a hydrogen or a C1-C5 alkyl group, and L may be one selected from groups represented by Formula 1a,

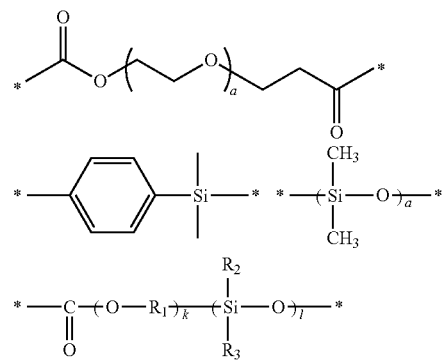

Formula 1a

In Formula 1a, $R_1$ is a C1-C5 alkylene group, $R_2$ and $R_3$ are each independently a C1-C5 alkyl group, a may be an integer from 1 to 10, k may be an integer from 1 to 10, l may be an integer from 1 to 10, and

* denotes a binding site to a neighboring atom.

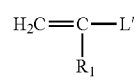

Formula 2

In Formula 2, $R_1$ may be a hydrogen or a C1-C5 alkyl group, and L' may be one selected from groups represented by Formula 2a.

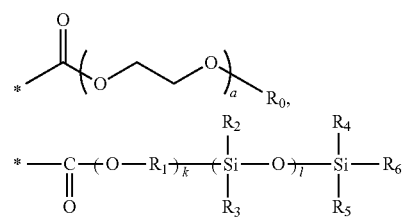

Formula 2a

In Formula 2a, a may be an integer from 1 to 10, $R_1$ may be a C1-C5 alkylene group, $R_0$ and $R_2$ to $R_6$ may be each independently a C1-C10 alkyl group, a C6-C10 aryl group, or a C1-C10 heteroaryl group, k may be an integer from 1 to 10, l may be an integer from 1 to 10, and

* denotes a binding site to a neighboring atom.

The polymer having an unsaturated functional group at a terminal thereof and a fluoroalkylene chain may be a compound represented by Formula 3.

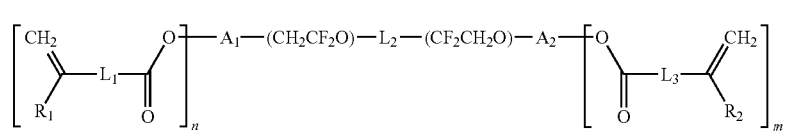

Formula 3

In Formula 3, $L_1$ and $L_3$ may be each independently a bond or —C(=O)O—R—NH—, wherein R may be a divalent, trivalent or tetravalent group and selected from a C1-C20 aliphatic hydrocarbon group, a C5-C40 cycloaliphatic group, a C5-C40 cycloaliphatic urethane group, a C6-C40 aryl group, and a C2-C40 heteroaryl group, $A_1$ and $A_2$ may be each independently a bond or a divalent, trivalent or tetravalent bonding group, $L_2$ may be a fluoropolyalkylene oxide chain or a perfluoropolyalkylene oxide chain, $R_1$ and $R_2$ may be each independently a hydrogen or a C1-C5 alkyl group, and n and m may be each independently an integer from 1 to 3.

In Formula 1,

L may be a group represented by the following formula:

$$-\underset{\underset{O}{\|}}{C}-(O-R_1)_k-(Si(R_2)(R_3)-O)_l-$$

wherein k and l are the same as in Formula 1a above.

In Formula 2, L' may be a group represented by the following formula:

$$-\underset{\underset{O}{\|}}{C}-(O-R_1)_k-(Si(R_2)(R_3)-O)_l-Si(R_4)(R_5)-R_6$$

wherein k and l are the same as in Formula 2a above.

As described above, L and L' may include a siloxane group-containing group, such as polydimethylsiloxane, having a low glass transition temperature and good thermal stability.

In Formula 3, $L_2$ may be a group represented by Formula 3a.

$$-(CF_2O)_p(CF_2CF_2O)_q(CFYO)_r(CF_2CFYO)_s-(CF_2(CF_2)_zCF_2O)_t- \quad \text{Formula 3a}$$

In Formula 3a,

Y may be a C1-05 perfluoroalkyl group or a C1-C5 perfluoroalkyloxy group,

Z may be 1 or 2, and p, q, r, s, and t may be each independently selected from 0 and a positive integer such that the weight average molecular weight of $L_2$ is about 500 to about 4,000 grams per mole (g/mol). For example, p, q, r, s, and t may be each independently an integer from 1 to 30, and in some embodiments, an integer from 1 to 10.

In Formula 3, $L_2$ may be a group represented by Formula 3b.

$$-(CF_2O)_p(CF_2CF_2O)_q- \quad \text{Formula 3b}$$

In Formula 3b, p and q may be each independently selected from 0 and a positive integer such that the weight average molecular weight of $L_2$ is about 500 to 4,000 g/mol. For example, p and q may be each independently an integer from 1 to 30, and in some embodiments, an integer from 1 to 10.

In Formula 3, $A_1$ and $A_2$ may be each independently a C5-C40 cycloaliphatic urethane group, for example, a group represented by the following formula:

In some embodiments, the amount of the ion-conductive polymer having an unsaturated functional group at a terminal thereof may be from about 0.1 part to 50 parts by weight, for example, about 1 part to about 30 parts by weight, based on 100 parts by weight of the polymer having an unsaturated functional group at a terminal thereof and a fluoroalkylene chain. While not wishing to be bound by theory, it is understood that when the amount of the ion-conductive polymer having an unsaturated functional group at a terminal thereof is within any of these ranges, the polymer electrolyte may have improved film formability and improved high-voltage stability without a phase separation.

A lithium electrode having a high electric capacity per unit weight may be used to implement a high-capacity battery. The lithium electrode may be a lithium metal or a lithium metal alloy thin film. However, dendritic growth on the lithium electrode serving as a negative electrode during deposition and dissolution of lithium ions may cause a short circuit between the positive electrode and the negative electrode. Furthermore, due to high reactivity to electrolyte, the lithium electrode may cause a side reaction with the electrolyte, and consequentially lower cycle lifespan of the battery. To eliminate this drawback, there is a need for an electrolyte that may protect a surface of the lithium metal or lithium metal alloy.

A polymer electrolyte according to any of the embodiments may serve as a protective layer.

Furthermore, for a lithium metal battery operating at a high voltage, there is a recent need for an electrolyte with improved stability. In this regard, the inventors of the present application provide a polymer electrolyte obtained by polymerization of a fluorine-based polymer having good strength and high electrochemical stability with an ion-conductive polymer having good lithium ion conductivity and a lithium ion transfer functional group. The ion-conductive polymer may be a polymer represented by Formula 1 or Formula 2. The fluorine-based polymer may be a polymer represented by Formula 3.

In some embodiments, the polymer electrolyte may have improved lithium ion mobility and improved resistance to chemicals at high temperature, compared with a polymer electrolyte consisting of a fluorine-based polymer. The polymer electrolyte may also be insoluble in liquid electrolyte, and thus, may not be impregnable with the liquid electrolyte, and consequentially, may have reduced reactivity to the lithium electrode. In some embodiments, the polymer electrolyte may have improved stability at high voltages and improved strength and flexibility.

A structure of a polymer electrolyte according to an embodiment now will be described with reference to FIGS. 1A to 1C. In the embodiment of FIGS. 1A to 1C, perfluoropolyether (PFPE) represented by Formula 6 and a poly (ethylene glycol) methyl ether (meth)acrylate (POEM) represented by Formula 15 are used as an exemplary fluorine-based polymer and an exemplary ion-conductive polymer, respectively.

Formula 6

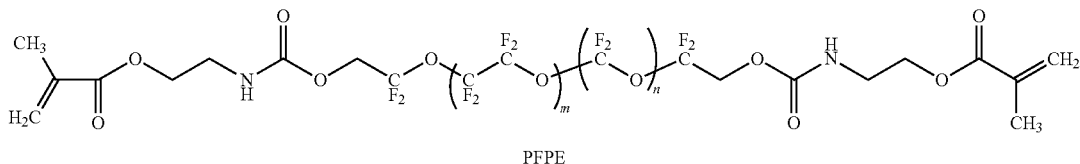

PFPE

In Formula 6,
m may be an integer from 1 to 5, and
n may be an integer from 1 to 5.

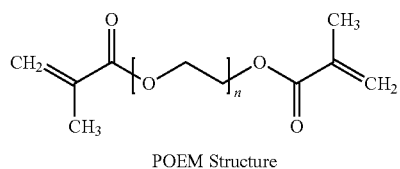

POEM Structure

In Formula 15, n may be an integer from 1 to 10.

In some embodiments, the polymer electrolyte may include a polymerization product of a fluorine-based polymer having an unsaturated functional group and an ion-conductive polymer having an unsaturated functional group. As illustrated in FIGS. 1A to 1C, the polymerization product may have a structure with POEM as an ion-conductive, hydrophilic unit introduced in a side chain of PFPE as a fluorine-based polymer and hydrophobic unit. Such a combination of the hydrophilic and hydrophobic units may result in a microphase separation structure and consequently increased solubility of lithium ions. Furthermore, the polymerization product may also be easily prepared on a large scale at a reduced cost.

The compound represented by Formula 3 may be a compound represented by Formula 4 or Formula 5.

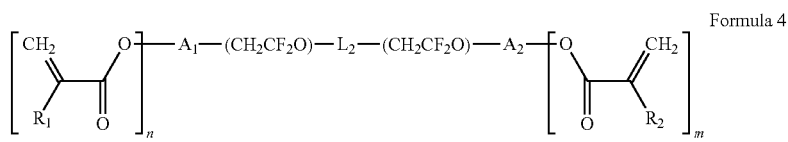

Formula 4

In Formula 4, $R_1$, $R_2$, $A_1$, n, m, $L_2$, and $A_2$ may be the same as in Formula 3.

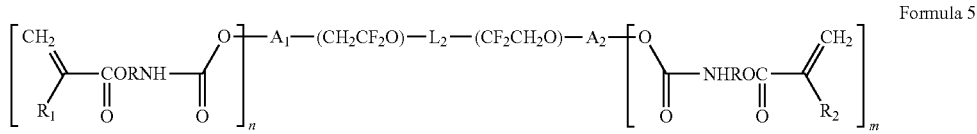

Formula 5

In Formula 5, $R_1$, $R_2$, A1, n, m, $L_2$, and $A_2$ may be the same as in Formula 3, and R may be a C1-C5 alkylene group.

The compound represented by Formula 4 and the compound represented by Formula 5 may be each independently a compound represented by Formula 4a or Formula 5a.

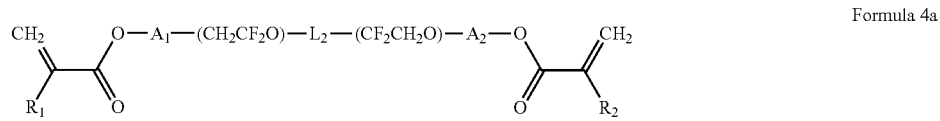

Formula 4a

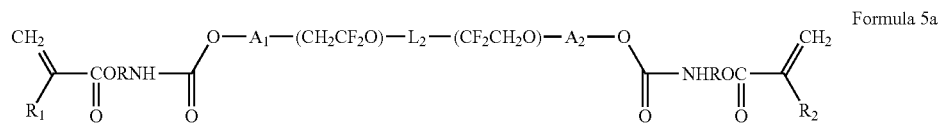

Formula 5a

The compound represented by Formula 3 may be, for example, at least one selected from $H_2C=C(CH_3)COOCH_2CH_2NHCOOCH_2CF_2O(CF_2CF_2O)_{p'}(CF_2O)_{q'}CF_2CH_2OCONHCH_2CH_2OCOC(CH_3)=CH_2$ (wherein p' and q' may be each independently selected such that the weight average molecular weight of $L_2$ is about 500 to 4,000 g/mol, and in some embodiments, about 1,200 to 3,000 g/mol, and in some other embodiments, about 1,500 to 2,500 g/mol), a compound represented by Formula 6, a compound represented by Formula 7, and a compound represented by Formula 17a. For example, p' and q' may be each independently an integer from 1 to 30, and in some embodiments, an integer from 1 to 10.

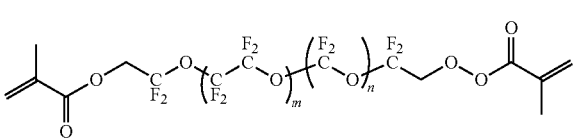

Formula 7

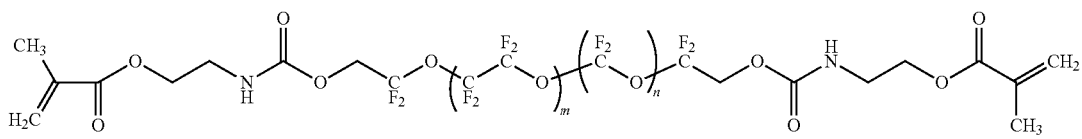

Formula 6

In Formula 6,
m may be an integer from 1 to 5, and
n may be an integer from 1 to 5.

In Formula 7,
m may be an integer from 1 to 5, and
n may be an integer from 1 to 5.

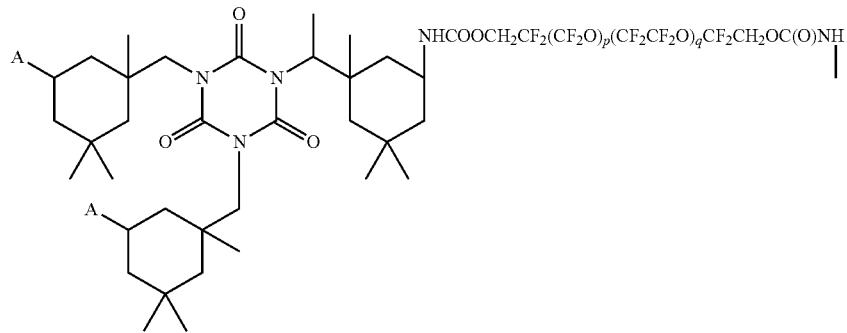

Formula 17a

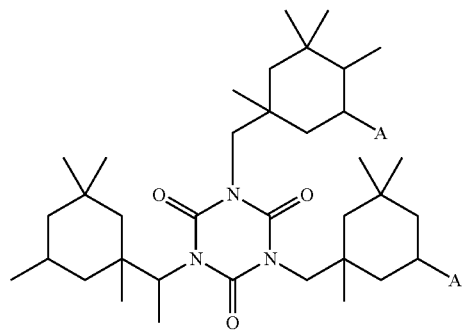

A is $CH_2=CHCOOCH_2CH_2OC(O)NH-$

In Formula 17a, p and q may be each independently selected from 0 and a positive integer such that to give a perfluoropolyether (PFPE) backbone —CF$_2$(CF$_2$O)$_p$(CF$_2$CF$_2$O)$_q$CF$_2$— having a weight average molecular weight of about 500 to 4,000 g/mol, and in some embodiments, about 1,200 to 3,000 g/mol, and in some other embodiments, about 1,500 to 2,500 g/mol.

The compound represented by Formula 1 may be, for example, a compound represented by the following formula:

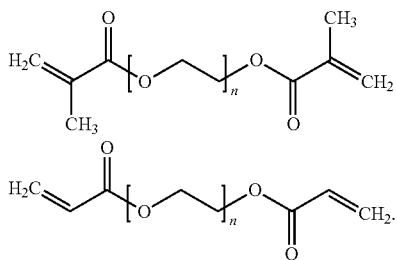

The compound represented by Formula 1 and the compound represented by Formula 2 may be each independently at least one selected from compounds represented by Formulae 15 to 19.

Formula 15

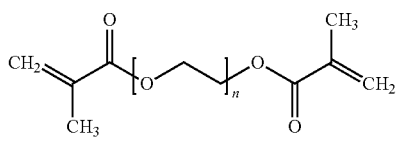

In Formula 15, n may be an integer from 1 to 10.

Formula 16

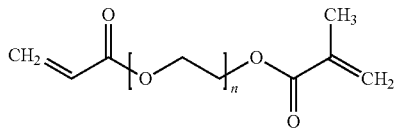

In Formula 16, n may be an integer from 1 to 10.

Formula 17

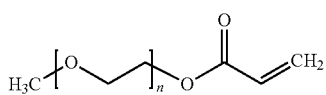

In Formula 17, n may be an integer from 1 to 10.

Formula 18

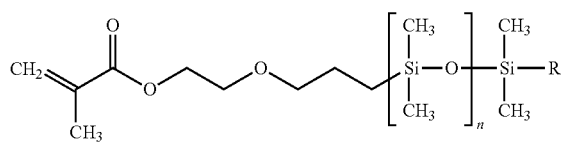

In Formula 18,
n may be an integer from 1 to 10, and
R may be a C1-C5 alkyl group, for example, a methyl group, an ethyl group, a butyl group, a propyl group, or a pentyl group.

Formula 19

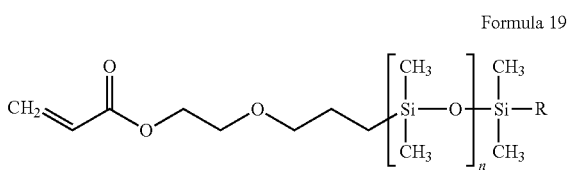

In Formula 19,
n may be an integer from 1 to 10, and
R may be a C1-C5 alkyl group, for example, a methyl group, an ethyl group, a butyl group, a propyl group, or a pentyl group.

In some embodiments, the polymerization product in the polymer electrolyte may be a compound represented by Formula 8 or a compound represented by Formula 9.

Formula 8

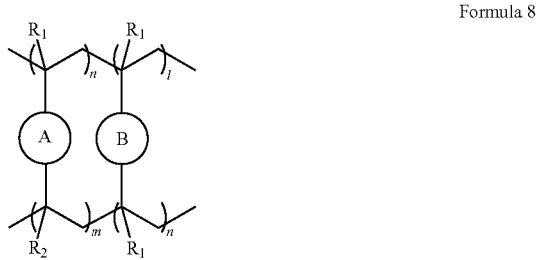

In Formula 8,
l may be an integer from 1 to 10,
m may be an integer from 1 to 10,
each n may be an integer from 1 to 10,
R$_1$ and R$_2$ may be independently hydrogen or a C1-C5 alkyl group,

may be one selected from groups represented by the following formula.

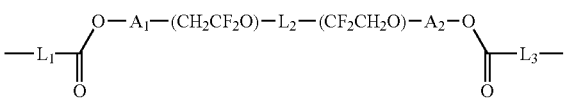

In the above formula,
L$_1$ and L$_3$ may be each independently a bond or —C(=O)O—R—NH—, wherein R may be a divalent, trivalent or tetravalent group, and selected from a C1-C20 aliphatic hydrocarbon group, a C5-C40 cycloaliphatic group, a C5-C40 cycloaliphatic urethane group, a C6-C40 aryl group, and a C2-C40 heteroaryl group,
A$_1$ and A$_2$ may be each independently a bond, or a divalent, trivalent or tetravalent bonding group,
L$_2$ may be a fluoropolyalkylene chain or a perfluoropolyalkylene chain, and

may be L, wherein L may be one selected from groups represented by Formula 1a.

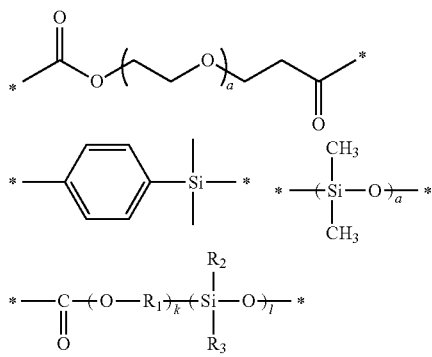

Formula 1a

In Formula 1a,
$R_1$ is a C1-C5 alkylene group,
$R_2$ and $R_3$ are each independently a C1-C5 alkyl group,
a may be an integer from 1 to 10,
k may be an integer from 1 to 10,
l may be an integer from 1 to 10, and
* denotes a binding site to a neighboring atom.

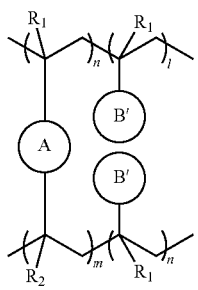

Formula 9

In Formula 9,
l may be an integer from 1 to 10,
m may be an integer from 1 to 10,
each n may be an integer from 1 to 10,
$R_1$ and $R_2$ may be independently hydrogen or a C1-C5 alkyl group,

may be the same as in Formula 8,

may be L', wherein L' may be one selected from groups represented by Formula 2a.

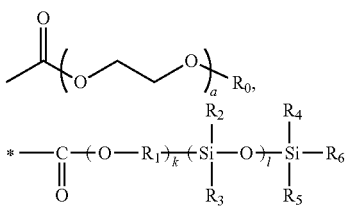

Formula 2a

In Formula 2a,
a may be an integer from 1 to 10,
$R_1$ may be a C1-C5 alkylene group,
$R_0$ and $R_2$ to $R_6$ may be each independently a C1-C10 alkyl group, a C6-C10 aryl group, or a C1-C10 heteroaryl group,
k may be an integer from 1 to 10,
l may be an integer from 1 to 10, and
* denotes a binding site to a neighboring atom.
In Formulas 8 and 9,

may be one selected from groups represented by Formula 10.

Formula 10

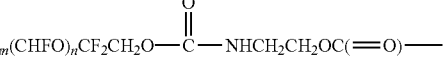
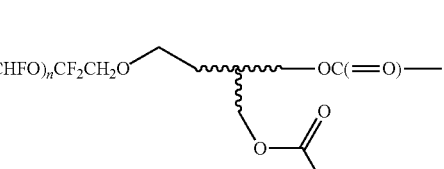
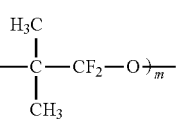
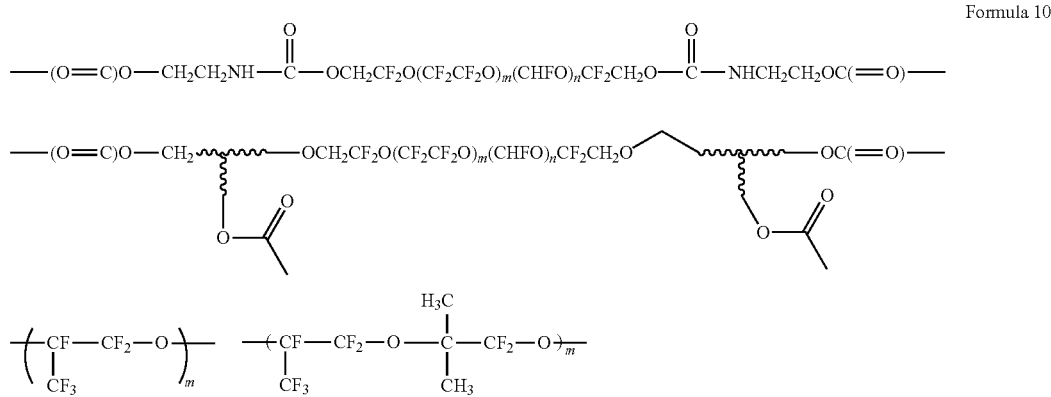

In Formula 10,
a wavy-lined region may be a C5-C40 cycloaliphatic urethane group, and m and n may be each independently an integer from 1 to 10.

In Formula 8,

may be one selected from groups represented by Formula 11.

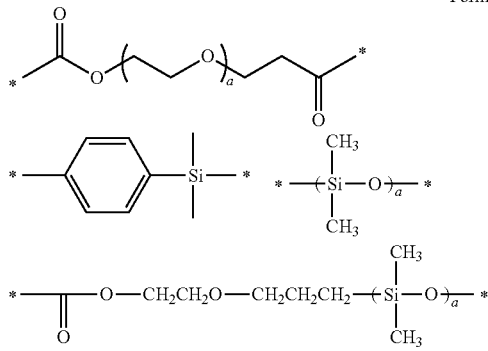

Formula 11

In Formula 11,
a may be an integer from 1 to 10, and
* denotes a binding site to a neighboring atom.

In Formula 9,

may be one selected from groups represented by Formula 12.

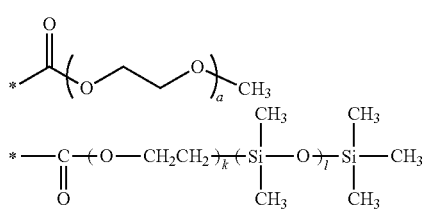

Formula 12

In Formula 12,
a may be an integer from 1 to 10,
* denotes a binding site to a neighboring atom,
k may be an integer from 1 to 10, and
l may be an integer from 1 to 10.

The C5-C40 cycloaliphatic urethane group may be a group represented by the following formula.

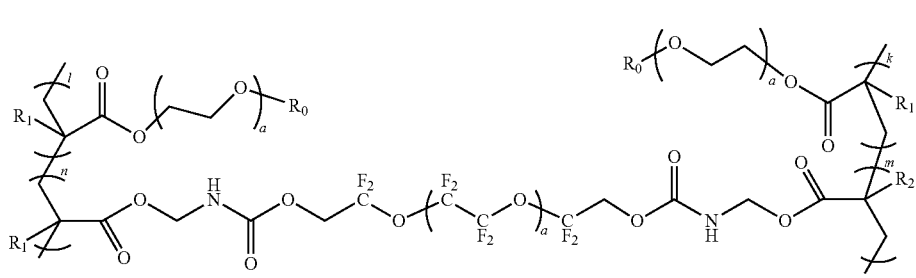

In of Formula 2a,
$R_1$ may be an ethylene group,
k may be an integer from 1 to 3,
$R_2$ to $R_5$ may be a methyl group
$R_6$ is each independently a C1-C10 alkyl group, a C6-C10 aryl group, or a C1-C10 heteroaryl group, and
l is an integer from 1 to 10, and
* may denote a bonding site to a neighboring atom.

In some embodiments, the polymerization product in the polymer electrolyte may be a compound represented by Formula 13, a compound represented by Formula 13b or a compound represented by Formula 14.

Formula 13

In Formula 13,
a may be an integer from 1 to 10,
m may be an integer from 30 to 100,
n may be an integer from 30 to 100,
l may be an integer from 50 to 100,
k may be an integer from 50 to 100, and
$R_0$, $R_1$ and $R_2$ may be each independently a hydrogen, a methyl group, an ethyl group, a propyl group, an iso-propyl group, a butyl group, or a pentyl group.

In some embodiments, the polymer electrolyte may further include a liquid electrolyte.

In some embodiments, the polymer electrolyte may further include a lithium salt. The lithium salt may be any lithium salt available for lithium metal batteries in the art. For example, the lithium salt may be at least one selected from $LiSCN$, $LiN(CN)_2$, $LiClO_4$, $LiBF_4$, $LiAsF_6$, $LiPF_6$, $LiCF_3SO_3$, $Li(CF_3SO_2)_2N$, $Li(CF_3SO_2)_3C$, $LiSbF_6$, $Li(FSO_2)_2N$, $LiC_4F_9SO_3$, $LiN(SO_2CF_2CF_3)_2$, $LiPF_3(C_2F_5)_3$, $LiPF_3(CF_3)_3$, $LiCl$, $LiF$, $LiBr$, $LiI$, lithium difluoro(oxalato)borate (LiFOB), and lithium(bis(oxalato)borate (LiBOB).

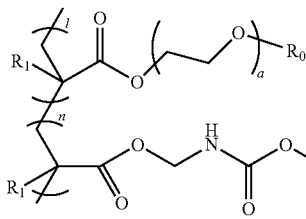
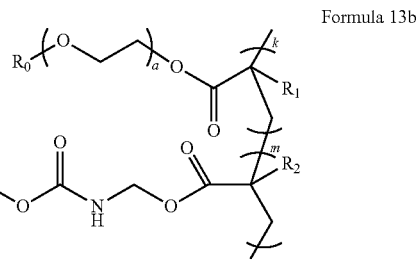

Formula 13b wherein, in Formula 13b,
m and n are each independently an integer from 30 to 100,
l and k are each independently an integer from 50 to 100, and
$R_0$, $R_1$, and $R_2$ are each independently a hydrogen, a methyl group, an ethyl group, a propyl group, an iso-propyl group, a butyl group, or a pentyl group,
A is —$(CF_2O)_a$—
a is an integer from 1 to 10.

A lithium metal battery including a polymer electrolyte according to any of the above-described embodiments may operate in the presence of liquid electrolyte. The liquid electrolyte may include a lithium salt and an organic solvent.

In some embodiments, the polymer electrolyte may be insoluble in the liquid electrolyte. The insolubility of the polymer electrolyte to liquid electrolyte means that the electrolyte may have a solvent impregnation ratio of about 5 percent by weight (wt %) or less, for example, about 0.01 to 5 wt %, wherein the solvent is at least one selected from, for example, ethylene carbonate, propylene carbonate, dimethylformamide, tetrahydrofuran, and chloroform.

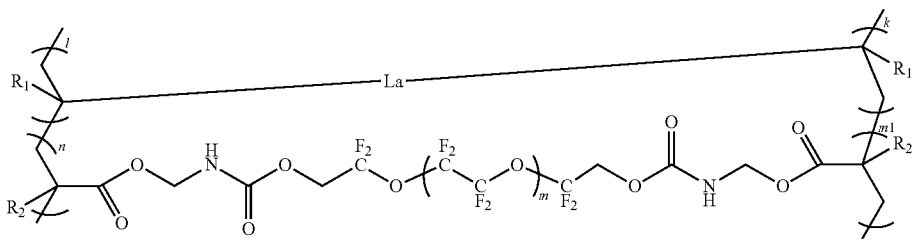

Formula 14

In Formula 14,
La may be a group represented by Formula 14a,
m may be an integer from 1 to 10,
$m_1$ may be an integer from 30 to 100,
n may be an integer from 30 to 100,
l may be an integer from 50 to 100,
k may be an integer from 50 to 100, and
$R_1$ and $R_2$ may be each independently a hydrogen, a methyl group, an ethyl group, a propyl group, an iso-propyl group, a butyl group, or a pentyl group.

For example, the amount of the lithium salt included in the polymer electrolyte may be from about 10 to 50 parts by weight, and in some embodiments, about 20 to 45 parts by weight, based on 100 parts by weight of the ion-conductive polymer having an unsaturated functional group at a terminal thereof.

In some embodiments, the polymer electrolyte may have a main peak having a maximum intensity at about 200° C. to 300° C., a minor peak at about 340° C. to 360° C., and a full width at half maximum (FWHM) of about 10° C. to 20° C., as analyzed by evolved gas analysis (EGA).

In some embodiments, the polymer electrolyte may be insoluble in the liquid electrolyte. The polymer electrolyte may have a solvent impregnation ratio of about 5 wt % or less, wherein the solvent is an organic solvent selected from, for example, ethylene carbonate (EC), propylene carbonate

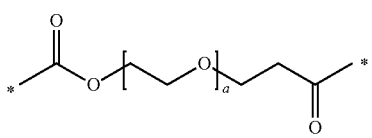

Formula 14a

In Formula 14a,
a may be an integer from 1 to 5, and
* denotes a binding site to a neighboring atom.

(PC), N-methylpyrrolidone (NMP), dimethylformamide (DMF), dimethyl sulfoxide (DMSO), tetrahydrofuran (THF), or chloroform.

In some embodiments, the polymer electrolyte may have a triplet at a chemical shift of about 65 to 75 parts per million (ppm), as analyzed by $^{13}C$-nuclear magnetic resonance (NMR) spectroscopy. The triplet may come from carbon of —C—O—, a different type of —C—O— from POEM.

In some embodiments, the polymer electrolyte may have a thickness of about 30 to 100 micrometers (μm). While not wishing to be bound by theory, it is understood that when the polymer electrolyte has a thickness within this range, the polymer electrolyte may have improved ion conductivity, mechanical characteristics, and flexibility.

In some embodiments, the polymer electrolyte may have an improved ion conductivity of about $10^{-6}$ siemens per centimeter (S/cm) or greater at room temperature (about 25° C.). In some embodiments, the polymer electrolyte may have an oxidation potential (vs. Li/Li$^+$) of about 4.3 volts (V) or greater, and improved mechanical characteristics with a Young's modulus of about 1 gigapascals (GPa) or greater.

In some embodiments, the polymer electrolyte may further include at least one selected from an ionic liquid and a polymer ionic liquid.

A polymer electrolyte according to any of the above-described embodiments may be used in a lithium metal battery using a lithium electrode. The lithium electrode may be, for example, a lithium metal or a lithium metal alloy. The lithium metal battery may be, for example, a lithium air battery, a lithium ion battery, a lithium polymer battery, or a lithium sulfur battery.

In some embodiments, the polymer electrolyte may be used as a protective layer of a lithium electrode or as an electrolyte. The polymer electrolyte may have improved interfacial characteristics and improved lithium transfer capability with a high lithium transference number.

An exemplary method of preparing a polymer electrolyte according to an embodiment now will be described below.

First, after a polymer having an unsaturated functional group at a terminal thereof and a fluoroalkylene chain, and an ion-conductive polymer having an unsaturated functional group at a terminal thereof are mixed together, a polymerization initiator may be added thereto to obtain a polymer electrolyte composition, followed by polymerization of the polymer electrolyte composition.

This polymerization reaction may be performed by heating or irradiation with, for example, ultraviolet (UV) rays. In this case, heat or light may be applied to avoid an adverse effect on a lithium metal electrode.

The polymerization reaction may be a cross-linking reaction or graft reaction.

In some embodiments, the polymerization reaction of the polymers in the polymer electrolyte composition may be performed by irradiation of light at room temperature (about 25° C.). For a cross-linking reaction by irradiation of light, a photopolymerization initiator may be used. The photopolymerization initiator may be any compound able to form a radical by light irradiation such as irradiation with ultraviolet (UV) rays. For example, the photopolymerization initiator may be at least one selected from 2-hydroxy-2-methyl-1-phenyl-propane-1-one (HMPP), benzoin ether, dialkyl acetophenone, hydroxyl alkylketone, benzil dimethyl ketal, acyl phosphine, and α-aminoketone. For example, the acyl phosphine may be 2,4,6-trimethyl-benzoyl-trimethyl phosphine oxide.

The thermopolymerization initiator may be at least one selected from a persulfate-based initiator, an azo-based initiator, and an initiator including hydrogen peroxide, and ascorbic acid. Non-limiting examples of the persulfate-based initiator are sodium persulfate ($Na_2S_2O_8$), potassium persulfate ($K_2S_2O_8$), and ammonium persulfate ($(NH_4)_2S_2O_8$). Non-limiting examples of the azo-based initiator are 2,2-azobis(2-amidinopropane)dihydrochloride, 2,2-azobis-(N, N-dimethylene)isobutyramidine dihydrochloride, 2-(carbamoylazo)isobutyronitrile, 2,2-azobis[2-(2-imidazolin-2-yl)propane] dihydrochloride, 4,4-azobis-(4-cyanovaleric acid), and the like.

The amount of the photopolymerization initiator or thermopolymerization initiator may be from about 0.005 parts to 5.0 parts by weight based on 100 parts by weight of the polymer having an unsaturated functional group at a terminal thereof and a fluoroalkylene chain, and the ion-conductive polymer having an unsaturated functional group at a terminal thereof. While not wishing to be bound by theory, it is understood that when the amount of the photopolymerization initiator or thermopolymerization initiator is within this range, the polymerization reaction may be easily initiated.

A lithium salt may be added to the polymer electrolyte composition. The amount of the lithium salt may be controlled within a mixed mole ratio (EO/Li) of ethylene oxide of the ion-conductive polymer to lithium ranging from about 10 to 25. While not wishing to be bound by theory, it is understood that when the polymer electrolyte has a mixed mole ratio (EO/Li) within this range, the polymer electrolyte may have improved lithium ion mobility (transference number), improved ion conductivity, and improved mechanical characteristics, so that lithium dendritic growth on a surface of the negative electrode may be effectively inhibited.

At least one selected from an organic solvent, an ionic liquid, a polymer ionic liquid, and an inorganic particle may be further added to the polymer electrolyte composition.

The ionic liquid refers to a salt in liquid state at room temperature or a fused salt at room temperature that consists of only ions, and that has a melting point below or equal to room temperature. For example, the ionic liquid may be at least one selected from compounds each including: i) a cation of at least one selected from an ammonium cation, a pyrrolidinium cation, a pyridinium cation, a pyrimidinium cation, an imidazolium cation, a piperidinum cation, a pyrazolium cation, an oxazolium cation, a pyridazinium cation, a phosphonium cation, a sulfonium cation, a triazolium cation, and mixtures thereof, and ii) at least one anion selected from $BF_4^-$, $PF_6^-$, $AsF_6^-$, $SbF_6^-$, $AlCl_4^-$, $HSO_4^-$, $ClO_4^-$, $CH_3SO_3^-$, $CF_3CO_2^-$, $Cl^-$, $Br^-$, $I^-$, $SO_4^-$, $CF_3SO_3^-$, $(FSO_2)_2N^-$, $(C_2F_5SO_2)_2N^-$, $(C_2F_5SO_2)(CF_3SO_2)N^-$, and $(CF_3SO_2)_2N^-$.

In some embodiments, the ionic liquid may be at least one selected from N-methyl-N-propylpyrrolidinium bis(trifluoromethylsulfonyl)imide, N-butyl-N-methyl-pyrrolidinium bis(3-trifluoromethylsulfonyl)imide, 1-butyl-3-methyl-imidazolium bis(trifluoromethylsulfonyl)imide, and 1-ethyl-3-methyl-imidazolium bis(trifluoromethylsulfonyl)imide.

The amount of the ionic liquid may be in a range of about 5 parts to about 40 parts by weight, and in some embodiments, about 10 parts to about 20 parts by weight, based on 100 parts by weight of the polymer electrolyte. While not wishing to be bound by theory, it is understood that when the amount of the ionic liquid is within any of these ranges, the polymer electrolyte may have improved ion conductivity and improved mechanical properties.

When the polymer electrolyte includes an ionic liquid and a lithium salt, a mole ratio (IL/Li) of the ionic liquid (IL) to lithium ions (Li) may be in a range of about 0.1 to about 2.0, and in some embodiments, about 0.2 to about 1.8, and in some other embodiments, about 0.4 to about 1.5. While not wishing to be bound by theory, it is understood that when the mole ratio of the ionic liquid to lithium ions is within any of these ranges, the polymer electrolyte may have high lithium ion mobility, good ion conductivity, and improved mechanical properties to effectively suppress growth of lithium dendrite on a surface of a negative electrode.

The polymer ionic liquid may be, for example, a polymerization product of ionic liquid monomers, or a polymeric compound. The polymer ionic liquid is highly soluble in an organic solvent, and thus, may further improve the ionic conductivity of the polymer electrolyte when further added.

When a polymer ionic liquid is prepared by polymerization of ionic liquid monomers as described above, a reaction product from the polymerization may need to be washed and dried, and may be further subjected to anionic substitution reaction to include appropriate anions that may impart solubility in an organic solvent.

In some embodiments, the polymer ionic liquid may include a repeating unit including: i) a cation of at least one selected from an ammonium cation, a pyrrolidinium cation, a pyridinium cation, a pyrimidinium cation, an imidazolium cation, a piperidinum cation, a pyrazolium cation, an oxazolium cation, a pyridazinium cation, a phosphonium cation, a sulfonium cation, a triazolium cation, and mixtures thereof, and ii) at least one anion selected from $BF_4^-$, $PF_6^-$, $AsF_6^-$, $SbF_6^-$, $AlCl_4^-$, $HSO_4^-$, $ClO_4^-$, $CH_3SO_3^-$, $CF_3CO_2^-$, $(CF_3SO_2)_2N^-$, $(FSO_2)_2N^-$, $Cl^-$, $Br^-$, $I^-$, $SO_4^-$, $CF_3SO_3^-$, $(C_2F_5SO_2)_2N^-$, $(C_2F_5SO_2)(CF_3SO_2)N^-$, $NO_3^-$, $Al_2Cl_7^-$, $(CF_3SO_2)_3C^-$, $(CF_3)_2PF_4^-$, $(CF_3)_3PF_3^-$, $(CF_3)_4PF_2^-$, $(CF_3)_5PF^-$, $(CF_3)_6P^-$, $SF_5CF_2SO_3^-$, $SF_5CHFCF_2SO_3^-$, $CF_3CF_2(CF_3)_2CO^-$, $(CF_3SO_2)_2CH^-$, $(SF_5)_3C^-$, and $(O(CF_3)_2C_2(CF_3)_2O)_2PO^-$.

In some other embodiments, the polymer ionic liquid may be prepared by polymerization of ionic liquid monomers as described above. For example, the ionic liquid monomers may have a polymerizable functional group such as a vinyl group, an allyl group, an acrylate group, and a methacrylate group, and may include a cation of at least one selected from an ammonium cation, a pyrrolidinium cation, a pyridinium cation, a pyrimidinium cation, an imidazolium cation, a piperidinum cation, a pyrazolium cation, an oxazolium cation, a pyridazinium cation, a phosphonium cation, a sulfonium cation, a triazolium cation, and mixtures thereof, and at least one of the above-listed anions.

Non-limiting examples of the ionic liquid monomers are 1-vinyl-3-ethylimidazolium bromide, a compound represented by Formula 21, or a compound represented by Formula 22.

Formula 21
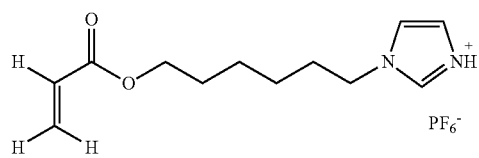

Formula 22
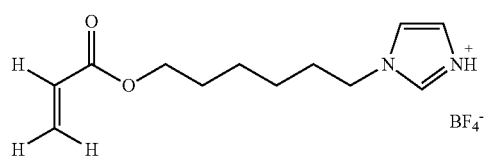

For example, the polymer ionic liquid may be a compound represented by Formula 23 or a compound represented by Formula 24.

Formula 23
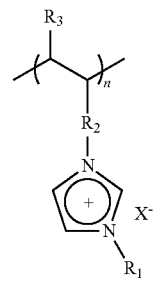

In Formula 23, $R_1$ and $R_3$ may be each independently a hydrogen, a substituted or unsubstituted C1-C30 alkyl group, a substituted or unsubstituted C2-C30 alkenyl group, a substituted or unsubstituted C2-C30 alkynyl group, a substituted or unsubstituted C6-C30 aryl group, a substituted or unsubstituted C2-C30 heteroaryl group, or a substituted or unsubstituted C4-C30 carbocyclic group;

$R_2$ may be a chemical bond or a C1-C30 alkylene group, a C6-C30 arylene group, a C2-C30 heteroarylene group, or a C4-C30 divalent carbocyclic group;

$X^-$ indicates an anion of the ionic liquid; and n may be from 500 to 2,800.

Formula 24
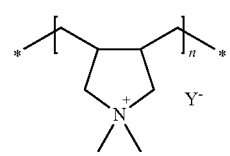

In Formula 24, $Y^-$ may be the same as $X^-$ in Formula 23; and n may be from 500 to 2,800.

For example, in Formula 24, $Y^-$ may be bis(trifluoromethylsulfonyl)imide (TFSI), bis(fluorosulfonyl)imide, $BF_4$, or $CF_3SO_3$.

In another example, the polymer ionic liquid may include a cation selected from poly(1-vinyl-3-alkylimidazolium) cation, poly(1-allyl-3-alkylimidazolium) cation, and poly(1-(methacryloyloxy-3-alkylimidazolium) cation, and an anion selected from $CH_3COO^-$, $CF_3COO^-$, $CH_3SO_3^-$, $CF_3SO_3^-$, $(CF_3SO_2)_2N^-$, $(FSO_2)_2N^-$, $(CF_3SO_2)_3C^-$, $(CF_3CF_2SO_2)_2N^-$, $C_4F_9SO_3^-$, $C_3F_7COO^-$, and $(CF_3SO_2)(CF_3CO)N^-$.

For example, the compound of Formula 24 may be polydiallyldimethyl ammonium bis(trifluoromethylsulfonyl)imide.

In some other embodiments, the polymer ionic liquid may include a low-molecular weight polymer, a thermally stable ionic liquid, and a lithium salt. The low-molecular weight polymer may have an ethylene oxide chain. The low-molecular weight polymer may be a glyme. Non-limiting examples of the glyme are polyethylene glycol dimethyl ether (polyglyme), tetraethylene glycol dimethyl ether (tetraglyme), and triethylene glycol dimethyl ether (triglyme).

The low-molecular weight polymer may have a weight average molecular weight of about 75 to about 2,000 g/mol, for example, a weight average molecular weight of about 250 to about 500 g/mol. In some embodiments, the polymer electrolyte may further include an oligomer. The oligomer may be at least one selected from polyethylene glycol dimethyl ether and polyethylene glycol diethyl ether. The oligomer may have a weight average molecular weight of about 200 to about 2,000 g/mol. The amount of the oligomer may be about 5 parts to about 50 parts by weight based on 100 parts by weight of the polymer electrolyte. While not wishing to be bound by theory, it is understood that when such an oligomer is further added, the polymer electrolyte may have further improved film formability, mechanical properties, and ion conductivity characteristics.

According to another aspect of the present disclosure, a lithium metal battery includes:

a positive electrode;

a negative electrode including a lithium metal or a lithium metal alloy;

and a polymer electrolyte according to any of the above-described embodiments.

After repeated cycles of charging and discharging, structural stability of the polymer electrolyte in the lithium metal battery may be maintained. This is attributed to the fact that the backbone of the polymerization product forming the polymer electrolyte consists of a fluorine-based polymer having good flexibility and strong mechanical strength, wherein the fluorine-based polymer is immiscible with a liquid electrolyte having a high dielectric constant, and thus, may maintain strong intensity during operation of the lithium metal battery. Furthermore, due to the ion-conductive polymer introduced into a side chain of the polymerization product, lithium ion transfer characteristics of the polymer electrolyte may be improved.

A lithium deposit layer on the negative electrode may have an improved deposition density of about 0.2 to 0.4 grams per cubic centimeter (g/cc).

The lithium metal battery may have a high driving voltage of about 4.0 V or greater, for example, about 4.0 to 5.0 V.

In some embodiments, the polymer electrolyte of the lithium metal battery may be a mixed electrolyte further including at least one of a liquid electrolyte, a solid electrolyte, a gel electrolyte, and a polymer ionic liquid, in addition to a polymer electrolyte, according to any of the above-described embodiments. In some embodiments, the lithium metal battery may further include a separator.

In some embodiment, the lithium metal battery may further include at least one selected from a liquid electrolyte, a polymer ionic liquid, a solid electrolyte, and a gel electrolyte. For example, the at least one selected from a liquid electrolyte, a polymer ionic liquid, a solid electrolyte, and a gel electrolyte may be disposed between the positive electrode and the polymer electrolyte. While not wishing to be bound by theory, it is understood that when the lithium metal battery further include at least one selected from a liquid electrolyte, a polymer ionic liquid, a solid electrolyte, and a gel electrolyte as described above, the ion conductivity and mechanical properties of the polymer electrolyte may be further improved.

The gel electrolyte may be any electrolyte in gel form known in the art. For example, the gel electrolyte may include a polymer and a polymer ionic liquid. For example, the polymer may be a solid graft (block) copolymer electrolyte.

The solid electrolyte may be, for example, an organic solid electrolyte or an inorganic solid electrolyte. Non-limiting examples of the organic solid electrolyte are polyethylene derivatives, polyethylene oxide derivatives, polypropylene oxide derivatives, a phosphoric acid ester polymer, a polyester sulfide, polyvinyl alcohol, polyfluoride vinylidene, and polymers including ionic dissociative groups.

Non-limiting examples of the inorganic solid electrolyte are $Li_3N$, $LiI$, $Li_5NI_2$, $Li_3N$—$LiI$—$LiOH$, $Li_2SiS_3$, $Li_4SiO_4$, $Li_4SiO_4$—$LiI$—$LiOH$, $Li_3PO_4$—$Li_2S$—$SiS_2$, $Cu_3N$, LiPON, $Li_2S.GeS_2.Ga_2S_3$, $Li_2O.11Al_2O_3$, $(Na, Li)_{1+x}Ti_{2-x}Al_x(PO_4)_3$ (wherein $0.1 \leq x \leq 0.9$), $Li_{1+x}Hf_{2-x}Al_x(PO_4)_3$ (wherein $0.1 \leq x \leq 0.9$), $Na_3Zr_2Si_2PO_{12}$, $Li_3Zr_2Si_2PO_{12}$, $Na_5ZrP_3O_{12}$, $Na_5TiP_3O_{12}$, $Na_3Fe_2P_3O_{12}$, $Na_4NbP_3O_{12}$, Na-Silicates, $Li_{0.3}La_{0.5}TiO_3$, $Na_5MSi_4O_{12}$ (wherein M may be a rare earth element, such as Nd, Gd, Dy, or the like) $Li_5ZrP_3O_{12}$, $Li_5TiP_3O_{12}$, $Li_3Fe_2P_3O_{12}$, $Li_4NbP_3O_{12}$, $Li_{1+x}(M,Al,Ga)_x(Ge_{1-y}Ti_y)_{2-x}(PO_4)_3$ (wherein $x \leq 0.8$, $0 \leq y \leq 1.0$, and M may be Nd, Sm, Eu, Gd, Tb, Dy, Ho, Er, Tm, or Yb), $Li_{1+x+y}Q_xTi_{2-x}Si_yP_{3-y}O_{12}$ (wherein $0 < x \leq 0.4$, $0 < y \leq 0.6$, and Q may be Al or Ga), $Li_6BaLa_2Ta_2O_{12}$, $Li_7La_3Zr_2O_{12}$, $Li_5La_3Nb_2O_{12}$, $Li_5La_3M_2O_{12}$ (wherein M may be Nb or Ta), and $Li_{7+x}A_xLa_{3-x}Zr_2O_{12}$ (wherein $0 < x < 3$, and A may be Zn).

FIG. 2 is a schematic view illustrating a structure of a lithium metal battery 11 according to an embodiment, wherein the lithium metal battery 11 includes a polymer electrolyte according to any of the above-described embodiments.

Referring to FIG. 2, the lithium metal battery 11 may include a positive electrode 12, a negative electrode 13, and a polymer electrolyte 14, according to any of the above-described embodiments, disposed between the positive electrode 12 and the negative electrode 13, and a battery case 15 accommodating the positive electrode 12, the negative electrode 13, and the polymer electrolyte 14.

For example, the positive electrode may be a porous positive electrode. The porous positive electrode may be a positive electrode including pores, or any positive electrode that allows permeation of liquid electrolyte thereinto by, for example, a capillary action.

For example, the porous positive electrode may be a positive electrode that may be obtained by coating a positive active material composition including a positive active material, a conducting agent, a binding agent, and a solvent and drying the resulting structure. The resulting positive electrode may include pores among particles of the positive active material. The porous positive electrode may be impregnated with a liquid electrolyte.

In some embodiments, the lithium metal battery 11 may include a liquid electrolyte, a gel electrolyte, or a solid electrolyte. The liquid electrolyte, the gel electrolyte, and the solid electrolyte may be any electrolyte available for a lithium battery in the art that does not react with the positive active material, and thus, may prevent deterioration of the positive active material during charging and discharging.

The constituent elements of a lithium metal battery according to an embodiment, including polymer electrolyte according to any of the above-described embodiments, and a method of manufacturing the lithium metal battery including the constituent elements now will be described in detail.

A positive active material for the positive electrode may include at least one selected from lithium cobalt oxide, lithium nickel cobalt manganese oxide, lithium nickel cobalt aluminum oxide, lithium iron phosphate, and lithium manganese oxide, but is not limited thereto. Any positive active materials available in the art may be used.

For example, the positive active material may be a compound represented by one of the following formulae: $Li_a$ $A_{1-b}B'_bD'_2$ (wherein 0.90≤a≤1.8 and 0≤b≤0.5); $Li_aE_{1-b}B'_bO_{2-c}D'_c$ (wherein 0.90≤a≤1.8, 0≤b≤0.5, and 0≤c≤0.05); $LiE_{2-b}B'_bO_{4-c}D'_c$ (wherein 0≤b≤0.5 and 0≤c≤0.05); $Li_aNi_{1-b-c}Co_bB'_cD'_\alpha$ (wherein 0.90≤a≤1.8, 0≤b≤0.5, 0≤c≤0.05, and 0<α≤2); $Li_aNi_{1-b-c}Co_bB'_cO_{2-\alpha}F'_\alpha$ (wherein 0.90≤a≤1.8, 0≤b≤0.5, 0≤c≤0.05, and 0<α<2); $Li_aNi_{1-b-c}Mn_bB'_cD'_\alpha$ (wherein 0.90≤a≤1.8, 0≤b≤0.5, 0≤c≤0.05, and 0<α≤2); $Li_aNi_{1-b-c}Mn_bB'_cO_{2-\alpha}F'_\alpha$ (wherein 0.90≤a≤1.8, 0≤b≤0.5, 0≤c≤0.05, and 0<α<2); $Li_aNi_bE_cG_dO_2$ (wherein 0.90≤a≤1.8, 0≤b≤0.9, 0≤c≤0.5, and 0.001≤d≤0.1); $Li_aNi_bCo_cMn_dGeO_2$ (wherein 0.90≤a≤1.8, 0≤b≤0.9, 0≤c≤0.5, 0≤d≤0.5, and 0.001≤e≤0.1); $Li_aNiG_bO_2$ (wherein 0.90≤a≤1.8, and 0.001≤b≤0.1); $Li_aCoG_bO_2$ (wherein 0.90≤a≤1.8 and 0.001≤b≤0.1); $Li_aMnG_bO_2$ (wherein 0.90≤a≤1.8 and 0.001≤b≤0.1); $Li_aMn_2G_bO_4$ (wherein 0.90≤a≤1.8 and 0.001≤b≤0.1); $QO_2$; $QS_2$; $LiQS_2$; $V_2O_5$; $LiV_2O_5$; $LiI'O_2$; $LiNiVO_4$; $Li_{(3-f)}J_2(PO_4)_3$ (wherein 0≤f≤2); $Li_{(3-f)}Fe_2(PO_4)_3$ (wherein 0≤f≤2); and $LiFePO_4$.

In the above formulae, A may be nickel (Ni), cobalt (Co), manganese (Mn), or any combination thereof; B' may be aluminum (Al), nickel (Ni), cobalt (Co), manganese (Mn), chromium (Cr), iron (Fe), magnesium (Mg), strontium (Sr), vanadium (V), a rare earth element, or any combination thereof; D' may be oxygen (O), fluorine (F), sulfur (S), phosphorus (P), or any combination thereof; E may be cobalt (Co), manganese (Mn), or any combination thereof; F' may be fluorine (F), sulfur (S), phosphorus (P), or any combination thereof; G may be aluminum (Al), chromium (Cr), manganese (Mn), iron (Fe), magnesium (Mg), lanthanum (La), cerium (Ce), strontium (Sr), vanadium (V), or any combination thereof; Q may be titanium (Ti), molybdenum (Mo), manganese (Mn), or any combination thereof; I' may be chromium (Cr), vanadium (V), iron (Fe), scandium (Sc), yttrium (Y), or any combination thereof; and J may be vanadium (V), chromium (Cr), manganese (Mn), cobalt (Co), nickel (Ni), copper (Cu), or any combination thereof.

For example, the positive active material may be one selected from compounds represented by Formulae 25 to 28.

$$Li_aNi_bCo_cMn_dO_2 \quad \text{Formula 25}$$

In Formula 25, 0.90≤a≤1.8, 0≤b≤0.9, 0≤c≤0.5, and 0≤d≤0.5.

$$Li_2MnO_3 \quad \text{Formula 26}$$

$$LiMO_2 \quad \text{Formula 27}$$

In Formula 27, M may be Mn, Fe, Co, or Ni.

$$Li_aNi_bCo_cAl_dO_2 \quad \text{Formula 28}$$

In Formula 28, 0.90≤a≤1.8, 0≤b≤0.8, 0≤c≤0.5, and 0≤d≤0.5.

In the Formulas 25 to 28, b+c+d=1, except that b, c, and d are both 0 at the same time.

The positive electrode of the lithium metal battery may be manufactured as follows.

A positive active material, a binder, and a solvent are mixed to prepare a positive active material composition. A conducting agent may be further added into the positive active material composition.

The positive active material composition may be directly coated on a metallic current collector and dried to prepare a positive electrode plate. Alternatively, the positive active material composition may be cast on a separate support to form a positive active material film. The positive active material film may then be separated from the support and then laminated on a metallic current collector to prepare a positive electrode plate.

The binder is an ingredient that may aid binding of an active material and a conducting agent and may aid binding to a current collector. The amount of the binder added may be from about 1 part to about 50 parts by weight based on 100 parts by weight of a total weight of the positive active material. Non-limiting examples of the binder include polyvinylidene fluoride (PVDF), polyvinyl alcohol, carboxymethylcellulose (CMC), starch, hydroxypropylcellulose, reproduced cellulose, polyvinylpyrrolidone, polytetrafluoroethylene, polyethylene, polypropylene, ethylene-propylene-diene terpolymer (EPDM), sulfonated EPDM, styrene butadiene rubber, fluorine rubber, and various copolymers. For example, the amount of the binder may be from about 2 parts to about 5 parts by weight based on 100 parts by weight of the total weight of the positive active material. While not wishing to be bound by theory, it is understood that when the amount of the binder is within any of the above ranges, the binding force of the active material layer to the current collector may be satisfactory.

The conducting agent may be any material that does not cause chemical change in the lithium metal battery and that is conductive. Non-limiting examples of the conducting agent include graphite such as natural graphite or artificial graphite; carbonacious materials, such as carbon black, acetylene black, Ketjen black, channel black, furnace black, lamp black, or summer black; conductive fibers, such as carbon fibers or metal fibers; carbon fluoride; metal powder, such as aluminum or nickel powder; conductive whisky, such as zinc oxide or potassium titanate; a conductive metal oxide, such as a titanium oxide; and a conductive polymer, such as a polyphenylene derivative.

The amount of the conducting agent may be from about 1 part to about 10 parts by weight, for example, from about 2 parts to about 5 parts by weight, based on 100 parts by weight of the total weight of the positive active material. While not wishing to be bound by theory, it is understood that when the amount of the conducting agent is within any of these ranges, the final positive electrode may have good conductivity characteristics.

A non-limiting example of the solvent is N-methylpyrrolidone.

The amount of the solvent may be from about 100 parts to about 2,000 parts by weight based on 100 parts by weight of the positive active material. While not wishing to be bound by theory, it is understood that when the amount of the solvent is within this range, it may become easy to perform a process of forming the active material layer.

The amounts of the positive active material, the conducting agent, the binder, and the solvent may be those levels as used in the manufacture of lithium batteries in the art. At least one of the conducting agent, the binder, and the solvent may be omitted depending on the use and the structure of the lithium metal battery.

The negative electrode may be a lithium metal thin film or a lithium metal alloy thin film as described above.

The lithium metal alloy may include lithium and a metal/metalloid alloyable with lithium. Examples of the metal/metalloid alloyable with lithium may be Si, Sn, Al, Ge, Pb, Bi, Sb, a Si—Y alloy (wherein Y may be an alkaline metal, an alkaline earth metal, a Group 13 to Group 16 element, a transition metal, a rare earth element, or a combination thereof, and may be not Si), an Sn—Y alloy (wherein Y may be an alkaline metal, an alkaline earth metal, a Group 13 to 16 element, a transition metal, a rare earth element, or a combination thereof, and may not be Sn). The element Y may be magnesium (Mg), calcium (Ca), strontium (Sr), barium (Ba), radium (Ra), scandium (Sc), yttrium (Y), titanium (Ti), zirconium (Zr), hafnium (Hf), rutherfordium (Rf), vanadium (V), niobium (Nb), tantalum (Ta), dubnium (Db), chromium (Cr), molybdenum (Mo), tungsten (W), seaborgium (Sg), technetium (Tc), rhenium (Re), bohrium (Bh), iron (Fe), lead (Pb), ruthenium (Ru), osmium (Os), hassium (Hs), rhodium (Rh), iridium (Ir), palladium (Pd), platinum (Pt), copper (Cu), silver (Ag), gold (Au), zinc (Zn), cadmium (Cd), boron (B), aluminum (Al), gallium (Ga), tin (Sn), indium (In), germanium (Ge), phosphorus (P), arsenic (As), antimony (Sb), bismuth (Bi), sulfur (S), selenium (Se), tellurium (Te), polonium (Po), or any combinations thereof.

A polymer electrolyte according to any of the above-described embodiments may be used as an electrolyte of the lithium metal battery.

In some embodiments, the lithium metal battery may further include a separator and/or a lithium salt-containing non-aqueous electrolyte that are commonly used in the art.

For example, the separator may be an insulating thin film having high ion permeability and strong mechanical strength. The separator may have a pore diameter of about 0.01 µm to about 10 µm, and a thickness of about 5 µm to about 20 µm. Non-limiting examples of the separator are olefin-based polymers, such as polypropylene, and sheets or non-woven fabric made of glass fiber or polyethylene. When a lithium metal battery includes a solid polymer electrolyte, the solid polymer electrolyte may also serve as the separator.

The separator may be a monolayer or a multilayer including at least two layers of polyethylene, polypropylene, polyvinylidene fluoride, or any combinations thereof. The multilayer may be a mixed multilayer. For example, the separator may be a two-layered separator including polyethylene and polypropylene layers, a three-layered separator including polyethylene, polypropylene and polyethylene layers, or a three-layered separator including polypropylene, polyethylene and polypropylene layers.

The lithium salt-containing non-aqueous electrolyte may include a non-aqueous electrolyte and a lithium salt.

The non-aqueous electrolyte may be a non-aqueous liquid electrolyte, an organic solid electrolyte, or an inorganic solid electrolyte.

The non-aqueous liquid electrolyte may include an organic solvent. The organic solvent may be any organic solvent available in the art. For example, the organic solvent may be propylene carbonate, ethylene carbonate, fluoroethylene carbonate, butylene carbonate, dimethyl carbonate, diethyl carbonate, methyl ethyl carbonate, methyl propyl carbonate, ethyl propyl carbonate, methyl iso-propyl carbonate, dipropyl carbonate, dibutyl carbonate, chloroethylene carbonate, benzonitrile, acetonitrile, tetrahydrofuran, 2-methyltetrahydrofuran, γ-butyrolactone, 1,3-dioxolane, 4-methyldioxolane, N,N-dimethyl formamide, N,N-dimethyl acetamide, dimethylsulfoxide, dioxane, 1,2-dimethoxyethane, sulfolane, dichloroethane, chlorobenzene, nitrobenzene, diethylene glycol, dimethyl ether, or a mixture thereof.

For example, the lithium salt may be $LiPF_6$, $LiBF_4$, $LiSbF_6$, $LiAsF_6$, $LiClO_4$, $LiCF_3SO_3$, $Li(CF_3SO_2)_2N$, $Li(FSO_2)_2N$, $LiC_4F_9SO_3$, $LiAlO_2$, $LiAlCl_4$, $LiN(C_xF_{2x+1}SO_2)(C_yF_{2y+1}SO_2)$ (wherein x and y are each a natural number), LiCl, LiI, or any combination thereof.

To improve charge-discharge characteristics and resistance to flame in the lithium metal battery, pyridine, triethylphosphate, triethanolamine, cyclic ether, ethylene diamine, n-glyme, hexamethyl phosphoramide, nitrobenzene derivative, sulfur, a quinone imine dye, N-substituted oxazolidinone, N,N-substituted imidazolidine, ethylene glycol dialkyl ether, an ammonium salt, pyrrole, 2-methoxyethanol, or aluminum trichloride may be added to the non-aqueous electrolyte. In some embodiments, to provide non-flammable characteristics, a halogen-containing solvent such as carbon tetrachloride, ethylene trifluoride, or the like may be further added to the non-aqueous electrolyte, if needed.

For example, a lithium metal battery according to any one of the above-described embodiments may have improved capacity and improved lifetime characteristics, and thus, may be used in a battery cell for use as a power source of a small device, and may also be used as a unit battery of a medium-large size battery pack or battery module including a plurality of battery cells for use as a power source of a medium-large size device.

Examples of the medium-large size device are electric vehicles (EVs), including hybrid electric vehicles (HEVs) and plug-in hybrid electric vehicles (PHEVs); electric two-wheeled vehicles, including E-bikes and E-scooters; power tools; power storage devices; and the like. However, embodiments are not limited thereto.

One or more embodiments of the present disclosure will now be described in detail with reference to the following examples. However, these examples are only for illustrative purposes and are not intended to limit the scope of the one or more embodiments of the present disclosure.

EXAMPLES

Example 1: Preparation of Polymer Electrolyte

Perfluoropolyether (PFPE)-dimethacrylate (Fluorolink®, available from Solvay) of Formula 6, a lithium salt (LiTFSI), and poly(ethylene glycol) methyl ether acrylate (POEM) of Formula 17 were mixed together, wherein a mixed ratio of PFPE-dimethacrylate (Fluorolink®, available from Solvay) of Formula 6 to POEM of Formula 17 was about 7:3 by weight.

Formula 6

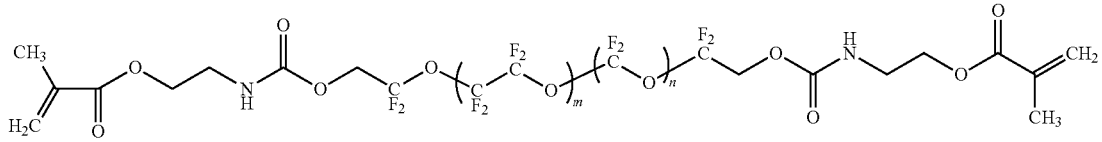

In Formula 6, m is 5, and n is 5.

Formula 17

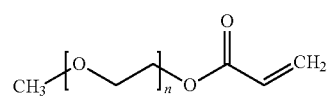

In Formula 17, n is 10.

About 5 parts by weight of a photopolymerization initiator (Darocur® 1173, available from BASF), based on 100 parts by weight of the PFPE-dimethacrylate, was added to the mixture to obtain a polymer electrolyte composition. The polymer electrolyte composition was cast on a support substrate, and subjected to ultraviolet (UV) irradiation under $N_2$ atmosphere to obtain a polymer electrolyte including a polymer represented by Formula 13a. The amount of the lithium salt (LiTFSI) was controlled in such a way as to reach a mixed mole ratio of about 18:1 between ethylene oxide of the POEM and the lithium salt.

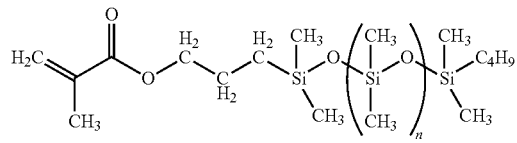

Formula 2b

In Formula 16, n is 5.

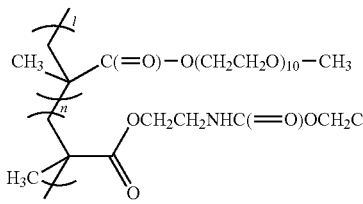

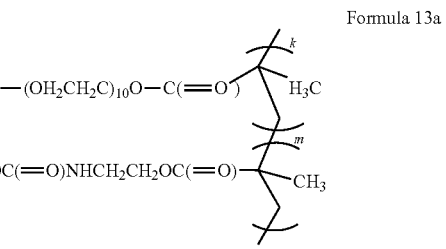

Formula 13a

In Formula 13a, m is 65, n is 75, l is 75, and k is 75.

The polymer of Formula 13a was a random copolymer.

Example 2: Preparation of Polymer Electrolyte

A polymer electrolyte was prepared in the same manner as in Example 1, except that polydimethylsiloxane monoacrylate represented by Formula 2b, instead of POEM, was used.

Example 3: Preparation of Polymer Electrolyte

A polymer electrolyte including a polymer represented by Formula 18a was prepared in the same manner as in Example 1, except that PFPE-tetraacrylate (FLK AD1700, a Solvay specialty polymer, a PFPE backbone molecular weight of about 4,000 g/mol, available Solvay) represented by Formula 17a, instead of PFPE-dimethacrylate, was used. A mixed ratio of PFPE-tetraacrylate of Formula 17a (PFPE-TA) to POEM of Formula 17 was about 6:4 by weight.

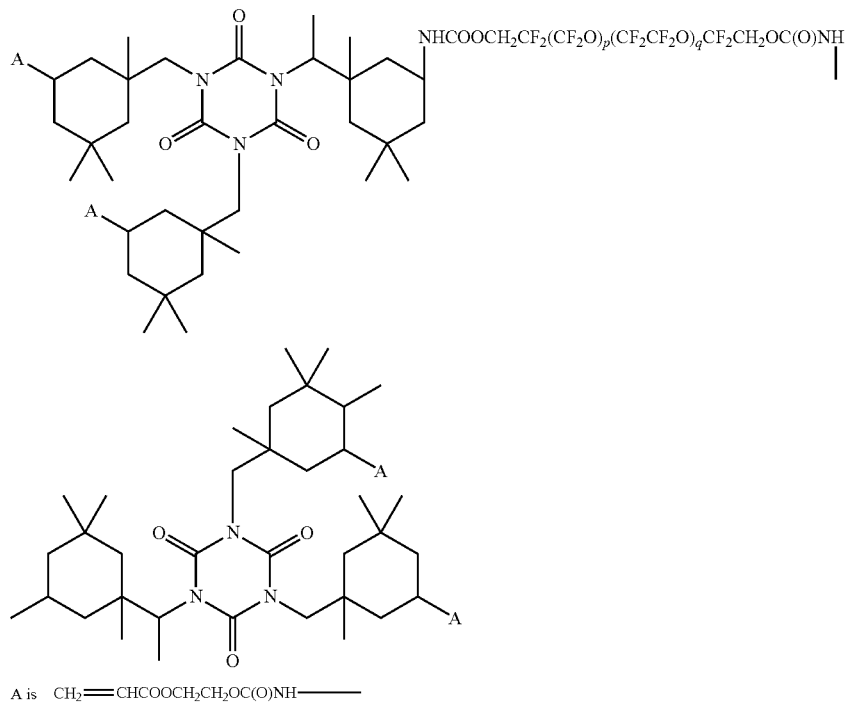

Formula 17a

In Formula 17a, p and q were controlled to have a PFPE backbone having a weight average molecular weight (Mw) of about 4,000 g/mol.

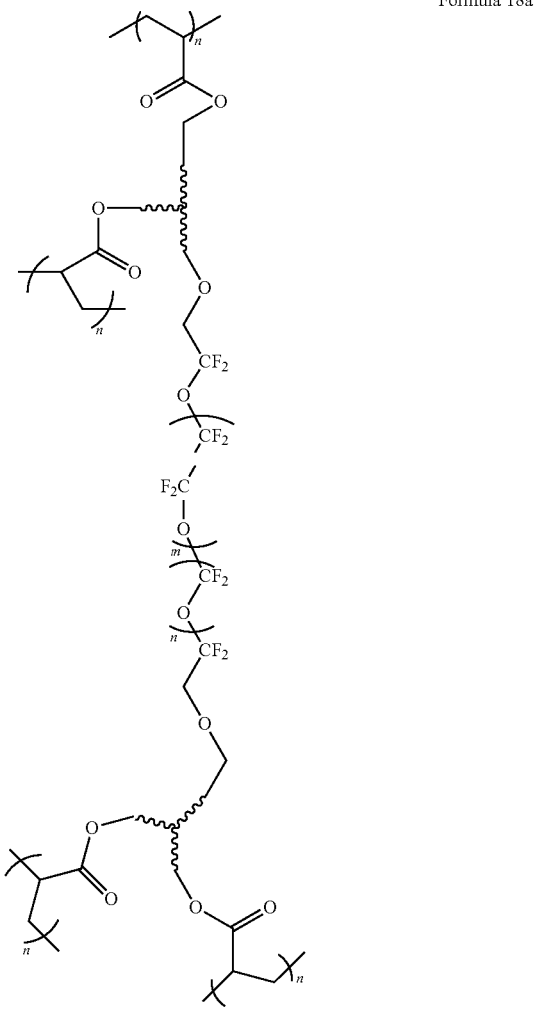

Formula 18a

In Formula 18a, a wavy-lined region indicates a group presented by Formula 19, and n is an integer from about 65 to 75.

Formula 19

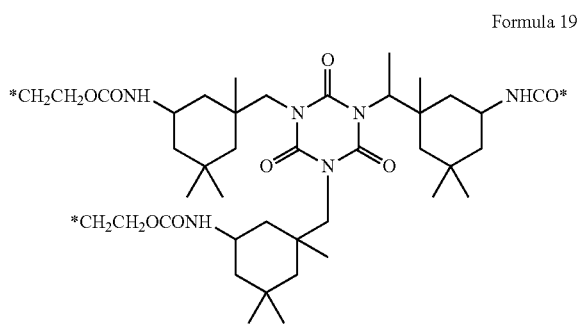

In Formula 19, * denotes a binding site to a neighboring atom. The polymer of Formula 19 was a random copolymer.

Example 4: Preparation of Polymer Electrolyte

A polymer electrolyte was prepared in the same manner as in Example 3, except that polydimethylsiloxane monoacrylate of Formula 16 used in Example 2, instead of POEM, was used. A mixed ratio of PFPE-tetraacrylate of Formula 17a (PFPE-TA) to polydimethylsiloxane monoacrylate of Formula 16 (PDMS) was about 6:4 by weight.

Example 5: Manufacture of Lithium Metal Battery (Coin Cell)

$LiCoO_2$, a conducting agent (Super-P, available from Timcal Ltd.), polyvinylidene fluoride (PVdF), and N-methylpyrrolidone were mixed together to obtain a positive electrode composition. A mixed weight ratio of the $LiCoO_2$, the conducting agent, and PVdF in the positive electrode composition was about 97:1.5:1.5.

The positive electrode composition was coated on a surface of an aluminum foil having a thickness of about 15 micrometers (μm), dried at about 25° C., and further dried at about 110° C. in a vacuum to thereby manufacture a positive electrode.

A lithium metal battery (coin cell) was assembled with the polymer electrolyte of Example 1 between the manufactured positive electrode and a lithium metal negative electrode having a thickness of about 20 μm, followed by placing a polyethylene/polypropylene separator between the positive electrode and the polymer electrolyte and adding a liquid electrolyte. The liquid electrolyte was an electrolyte of 1.3 molar (M) $LiPF_6$ dissolved in a mixed solvent of fluoroethylene carbonate (FEC) and diethylcarbonate (DEC) in a volume ratio of about 6:4.

Examples 6 to 8: Manufacture of Lithium Metal Battery (Coin Cell)

Lithium metal batteries (coin cells) were manufactured in the same manner as in Example 5, except that the polymer electrolytes of Examples 2 to 4, instead of the polymer electrolyte of Example 1, were used, respectively.

Example 9: Manufacture of Lithium Metal Battery (Pouch Cell)

$LiCoO_2$, a conducting agent (Super-P, available from Timcal Ltd.), polyvinylidene fluoride (PVdF), and N-methylpyrrolidone were mixed together to obtain a positive electrode composition. A mixed weight ratio of $LiCoO_2$, the conducting agent, and PVdF in the positive electrode composition was about 97:1.5:1.5. The positive electrode composition was coated on an aluminum foil having a thickness of about 15 μm, dried at about 25° C., and further dried at about 110° C. in a vacuum to manufacture a positive electrode.

The polymer electrolyte composition prepared as in Example 1 was coated on a lithium metal thin film having a thickness of about 25 μm to a thickness of about 10 μm with a doctor blade, followed by irradiation of light to thereby manufacture a lithium metal negative electrode with a polymer electrolyte thereon.

An electrode assembly was manufactured with a polyethylene separator between the positive and negative electrodes manufactured as described above. A liquid electrolyte including 1 M LiFSI dissolved in a mixture of dimethylether (DME) and 1,1,2,2-tetrafluoroethyl 2,2,3,3-tetrafluoropropyl ether (TTE) in a volume ratio of about 2:8 was used.

The electrode assembly was wrapped with a pouch (D-EL35H, available from Dai Nippon Printing Co.), and the pouch containing the electrode assembly was filled with the liquid electrolyte, and hermetically sealed, thereby manufacturing a laminate lithium metal battery having a capacity of about 250 milliampere hours (mAh).

Examples 10 and 11: Manufacture of Lithium Metal Battery (Pouch Cell)

Lithium metal batteries (pouch cells) were manufactured in the same manner as in Example 9, except that the polymer electrolytes of Examples 2 and 3, instead of the polymer electrolyte of Example 1, were used, respectively.

Comparative Example 1: Preparation of Polymer Electrolyte

After PFPE-dimethacrylate and about 5 parts by weight of a photoinitiator (Darocur® 1173, available from BASF), based on 100 parts by weight of a total weight of PFPE-dimethacrylate, were mixed with about 15 percent by weight (wt %) of a LiTFSI solution thereby obtaining a polymer electrolyte composition. The LiTFSI solution was obtained by dissolving LiTFSI as a lithium salt in tetrahydrofuran (THF). The polymer electrolyte composition was cast on a support substrate, followed by UV irradiation under $N_2$ atmosphere to thereby obtain a polymer electrolyte.

Comparative Example 2: Preparation of Polymer Electrolyte

After 10 grams (g) of POEM of Formula 17 as used in Example 1 was dissolved in 50 milliliters (mL) of ethyl acetate, 0.01 g of azobisisobutyronitrile (AIBN) was added thereto to thereby obtain a polymer electrolyte composition. After the polymer electrolyte composition was stirred at about 60° C., hexane was added to the stirred polymer electrolyte composition to obtain a precipitate. The precipitate was filtered and purified to thereby obtain a polymer electrolyte.

Comparative Examples 3 and 4: Manufacture of Lithium Metal Battery (Coin Cell)

Lithium metal batteries (coin cells) were manufactured in the same manner as in Example 5, except that the polymer electrolytes of Comparative Examples 1 and 2, instead of the polymer electrolyte of Example 1, were used, respectively.

Comparative Example 5: Manufacture of Lithium Metal Battery (Pouch Cell)

A lithium metal battery (pouch cell) was manufactured in the same manner as in Example 9, except that the polymer electrolyte of Comparative Example 1, instead of the polymer electrolyte of Example 1, was used.

Evaluation Example 1: Lithium Transference Number

Lithium symmetric cells were manufactured with the polymer electrolytes of Examples 1 to 4 and Comparative Examples 1 and 2, each placed between lithium metal thin films. Lithium transference numbers ($t_{Li}$) of the lithium symmetric cells at about 60° C. were evaluated using Equation 1. Some of the results are shown in Table 1.

A current decay with time with respect to impedance and input voltage of a lithium symmetric cell were measured and used to calculate the lithium ion transference number (see Electrochimica Acta 93 (2013) 254, the content of which is incorporated herein in its entirety by reference).

$$t_{Li^+} = \frac{i_{ss}(\Delta V - i_0 R^0)}{i_0(\Delta V - i_{ss} R^{ss})} \quad \text{Equation 1}$$

In Equation 1,
$\Delta V$ denotes a voltage change,
$i_o$ indicates an initial current,
$i_{ss}$ indicates a steady state current,
$R^0$ indicates an initial resistance, and
$R^{ss}$ indicates a steady state resistance.

TABLE 1

| Example | Lithium transference number ($t_{Li+}$) |
|---|---|
| Example 1 | 0.36 |
| Example 2 | 0.34 |
| Example 3 | 0.25 |
| Example 4 | 0.29 |
| Comparative Example 1 | NA |
| Comparative Example 2 | 0.18 |

Referring to Table 1, the polymer electrolytes of Examples 1 to 4 were found to have a higher lithium transference number, compared to those of Comparative Examples 1 and 2, indicating that the polymer electrolytes of Examples 1 to 4 may improve a lithium ion transfer function.

Figure 3:
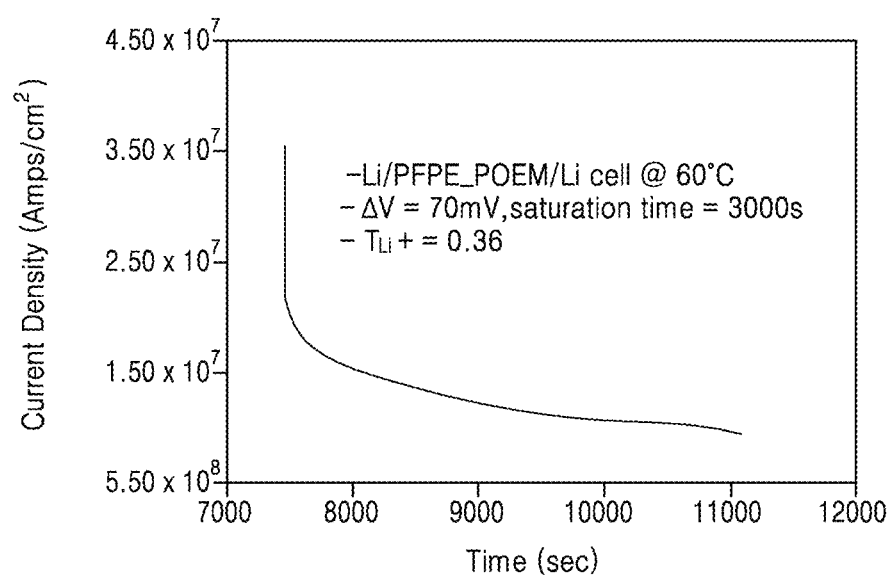
FIG. 3 is a graph of current density (amperes per square centimeter, Amps/cm$^2$) versus time (seconds, sec) showing change in current with respect to voltage in a lithium symmetric cell using a polymer electrolyte of Example 1.

A change in current with respect to voltage in the lithium symmetric cell using the polymer electrolyte of Example 1 is shown in FIG. 3.

Referring to FIG. 3, the polymer electrolyte of Example 1 was found to have an improved lithium ion transfer function, compared with polyethylene oxide.

Evaluation Example 2: Linear Sweep Voltammetry (LSV)

Lithium metal batteries were manufactured with the polymer electrolytes of Example 1 and Comparative Example 2, each placed between lithium metal thin films, and then analyzed by linear sweep voltammetry (LSV) to evaluate electrochemical stability. The results of the LSV performed to evaluate the electrochemical stability of each of the lithium metal batteries are shown in FIG. 4.

The analysis conditions by LSV were as follows: a voltage range of about 3 volts (V) to 7 V, a scan rate of about 0.1 millivolts per second (mV/s), and a temperature of about 25° C.

Figure 4:
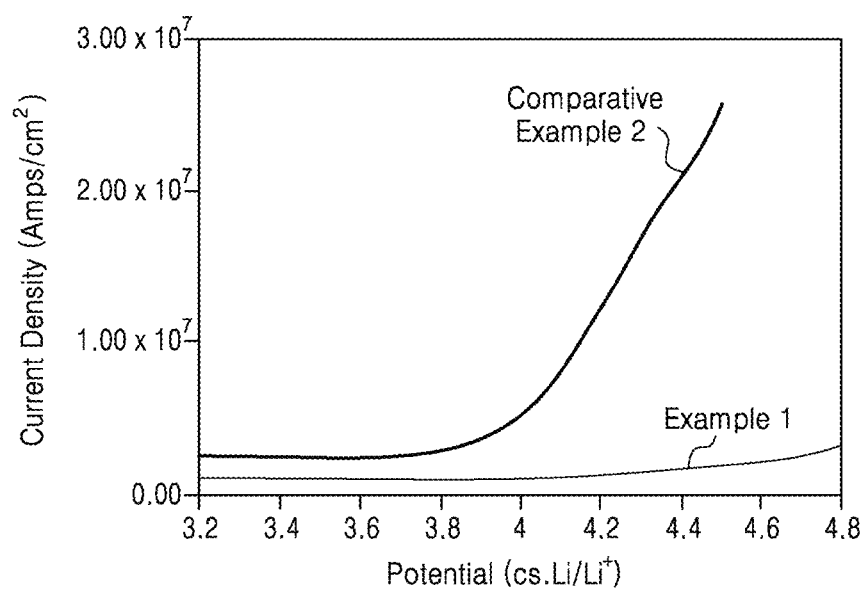
FIG. 4 is a graph of current density (amperes per square centimeter, Amps/cm$^2$) versus potential E (volts, V) illustrating the results of linear sweep voltammetry (LSV) in a lithium metal battery including the polymer electrolyte of Example 1 and a lithium metal battery including a polymer electrolyte of Comparative Example 2.

Referring to FIG. 4, the lithium metal battery using the polymer electrolyte of Comparative Example 2 was found to be electrochemically stable at a voltage up to 3.8 V, whereas the lithium metal battery using the polymer electrolyte of Example 1 was found to have improved electrochemical stability at a voltage up to about 4.3 V. These results indicate that the lithium metal battery using the polymer electrolyte of Example 1 has improved electrochemical stability, compared with the lithium metal battery using the polymer electrolyte of Comparative Example 2.

Evaluation Example 3: Discharge Capacity

1) Example 5

Each of the lithium metal battery of Example 5 and the lithium metal battery of Comparative Example 3 was charged at room temperature (about 25° C.) with a constant current of 0.1 C rate to a voltage of about 4.4 V with respect to lithium metal, and then discharged with a constant current of 0.2 C to a cutoff voltage of about 3.0 V. This cycle of charging and discharging was repeated 100 times.

Figure 5:
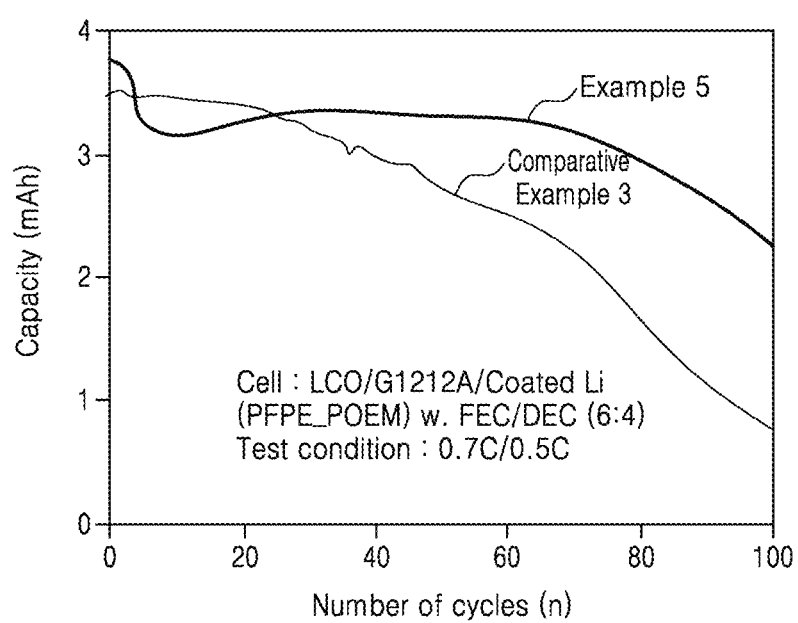
FIG. 5 is a graph of capacity (milliampere hours, mAh) with respect to the number of cycles (n) in lithium metal batteries of Example 5 and Comparative Example 3.

Change in capacity with respect to the number of cycles is shown in FIG. 5. The capacity retention rate of each of the lithium metal batteries was calculated using Equation 2.

Capacity retention rate (%)=(Capacity at $100^{th}$ cycle/ Capacity at $1^{st}$ cycle)×100     Equation 2

Referring to FIG. 5, the lithium metal battery of Example 5 was found to have improved charge and discharge characteristics and an improved capacity retention rate, compared to those of the lithium metal battery of Comparative Example 3.

2) Example 9 and Comparative Example 5

Charge and discharge characteristics and capacity retention rate characteristics of the lithium metal batteries of Example 9 and Comparative Example 5 were evaluated in the same manner as the evaluation of discharge capacity and capacity retention rate of the lithium metal battery of Example 5 described above. The evaluation results are shown in FIG. 6.

Figure 6:
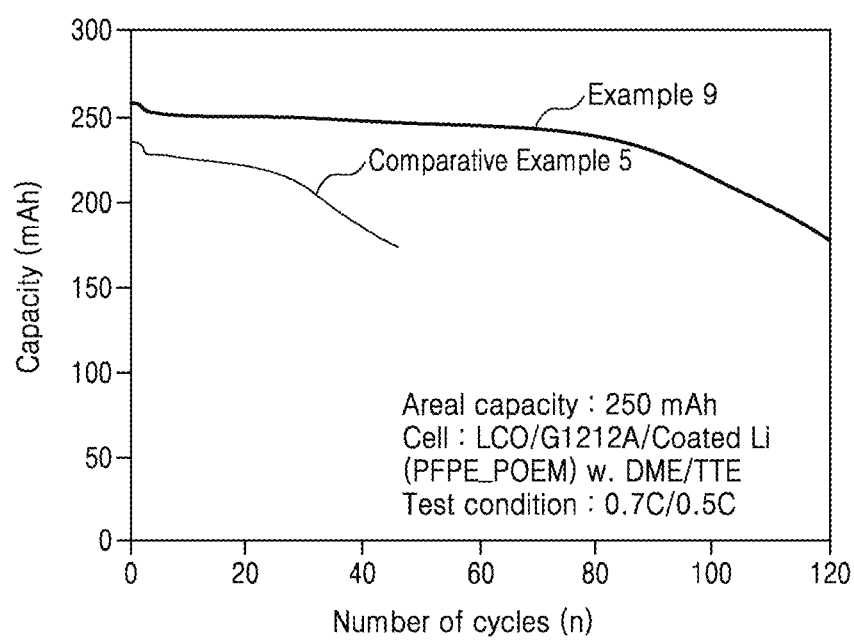
FIG. 6 is a graph of capacity (milliampere hours, mAh) with respect to the number of cycles (n) in lithium metal batteries of Example 9 and Comparative Example 5.

Referring to FIG. 6, the lithium metal battery of Example 9 was found to have an improved capacity retention rate due to improved durability, compared to the lithium metal battery of Comparative Example 5.

Evaluation Example 4: Evolved Gas Analysis (EGA)

The polymer electrolytes of Example 1, Comparative Example 1, and Comparative Example 2 were analyzed by evolved gas analysis (EGA) using an Agilent 6890/5973 Gas Chromatograph-Mass spectrometer (GC-MS) 6890/5973 system. The results of the EGA are shown in FIG. 7.

Figure 7:
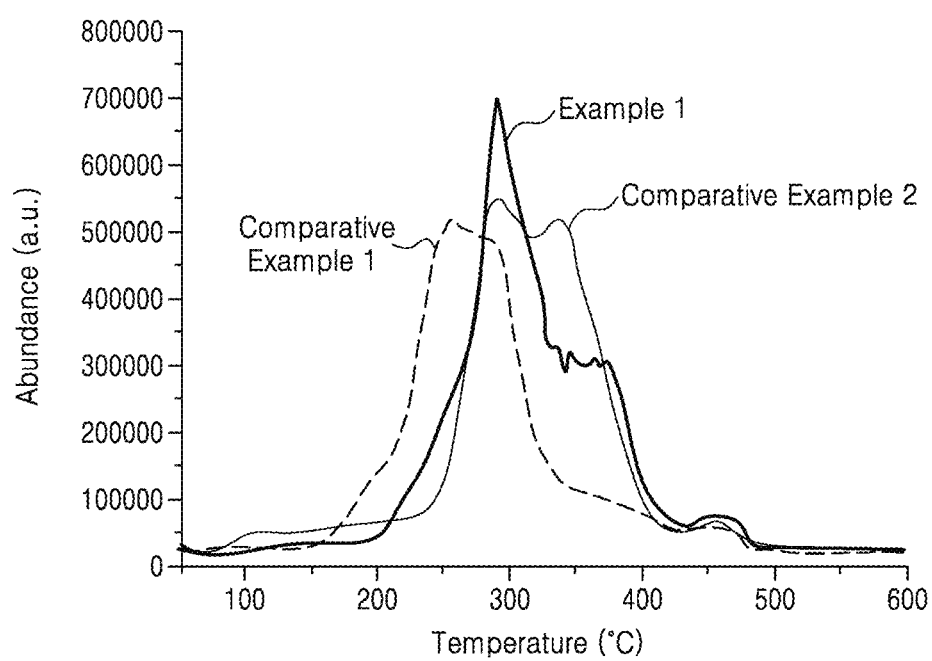
FIG. 7 is a graph of abundance (arbitrary units, a.u.) versus temperature (degrees Centigrade, °C.) illustrating the results of evolved gas analysis (EGA) on the polymer electrolytes of Example 1, Comparative Example 1, and Comparative Example 2.

Referring to FIG. 7, in the polymer electrolyte of Comparative Example 1, a fluorine-based material was detected at about 250° C. to 300° C. In the polymer electrolyte of Comparative Example 2, a methacrylate-based material was detected at about 290° C. and about 340° C. However, in the polymer electrolyte of Example 1, a fluorine-based material and a methacrylate-based material were detected at about 290° C. and about 350° C., respectively, which is a distinct pattern from the polymer electrolytes of Comparative Examples 1 and 2.

Evaluation Example 5: Infrared (IR) Spectroscopy

The polymer electrolytes of Example 1, Comparative Example 1, and Comparative Example 2 were analyzed by IR spectroscopy using a Bruker FTS-6000 spectrophotometer. The results of the IR spectroscopy are shown in FIGS. 8, 9A, and 9B.

Figure 8:
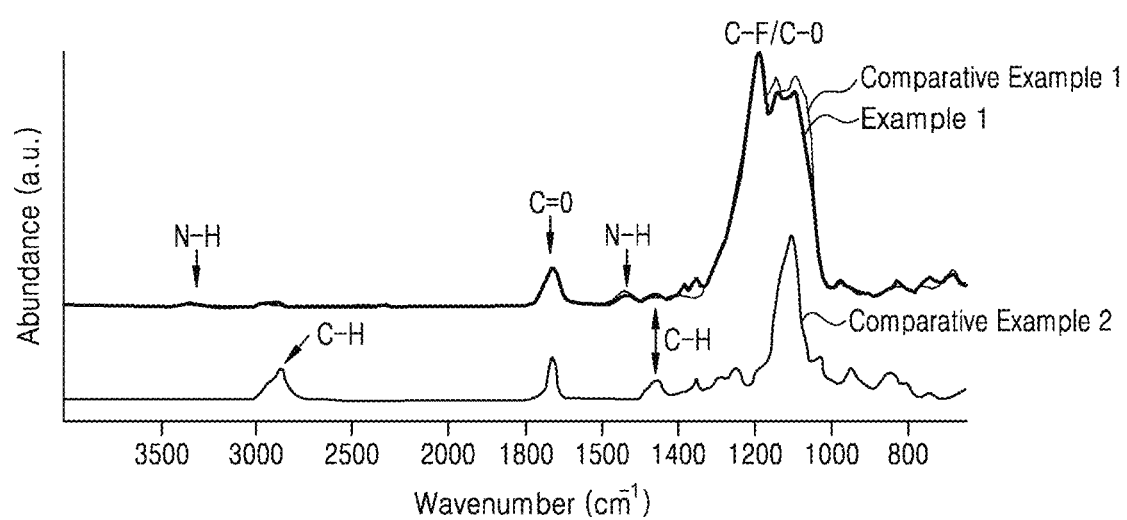
FIGS. 8, 9A, and 9B are graphs of abundance (arbitrary units, a.u.) versus wavenumber (reverse centimeters, cm$^{-1}$) illustrating the results of infrared (IR) spectroscopy on the polymer electrolytes of Example 1 and Comparative Examples 1 and 2.
Figure 9A:
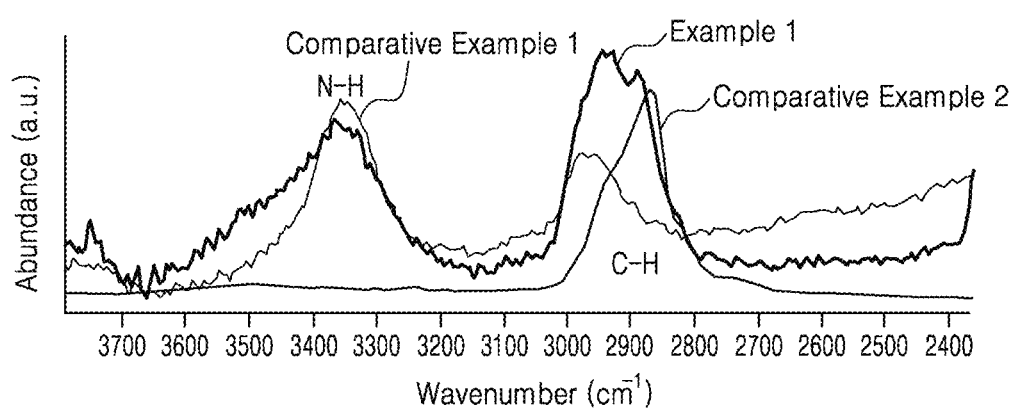
Figure 9B:
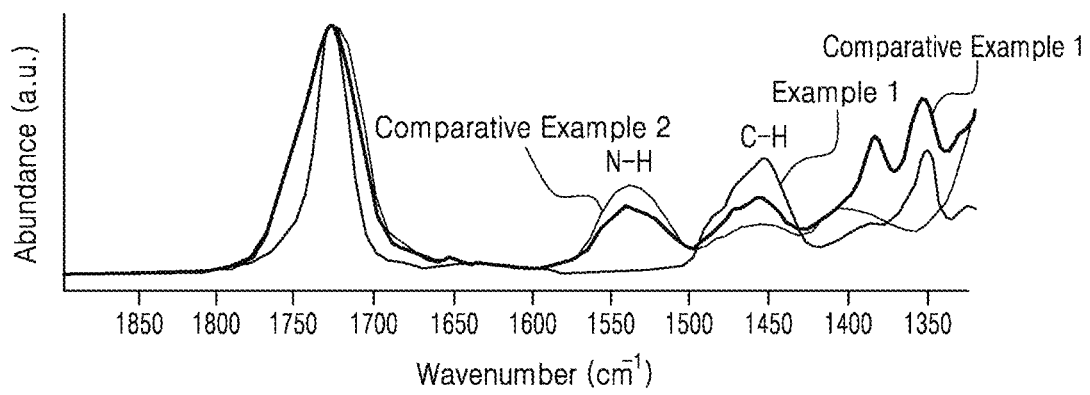

Referring to FIGS. 8, 9A, and 9B, in the polymer electrolyte of Example 1, a ratio of PFPE to POEM, the main ingredients of the polymer electrolyte of Example 1, were found to be about 7:3. The polymer electrolyte of Example 1 had an increased intensity ratio of C—H to N—H, compared to polymer electrolyte of Comparative Example 1.

Evaluation Example 6: $^{13}$C-NMR Spectroscopy

The polymer electrolytes of Example 1, Comparative Example 1, and Comparative Example 2 were analyzed by carbon-13 nuclear magnetic resonance ($^{13}$C-NMR) spectroscopy. Samples for analysis were prepared by dissolving 10 milligrams (mg) of each of the polymer electrolytes in 0.75 mL of a mixed solvent of acetone and dimethyl sulfoxide (DMSO). The analysis by $^{13}$C-NMR spectroscopy was performed using a Bruker's NMR 600 megahertz (MHz) spectrometer (AVANCE III). The analysis results are shown in FIG. 10.

Figure 10:
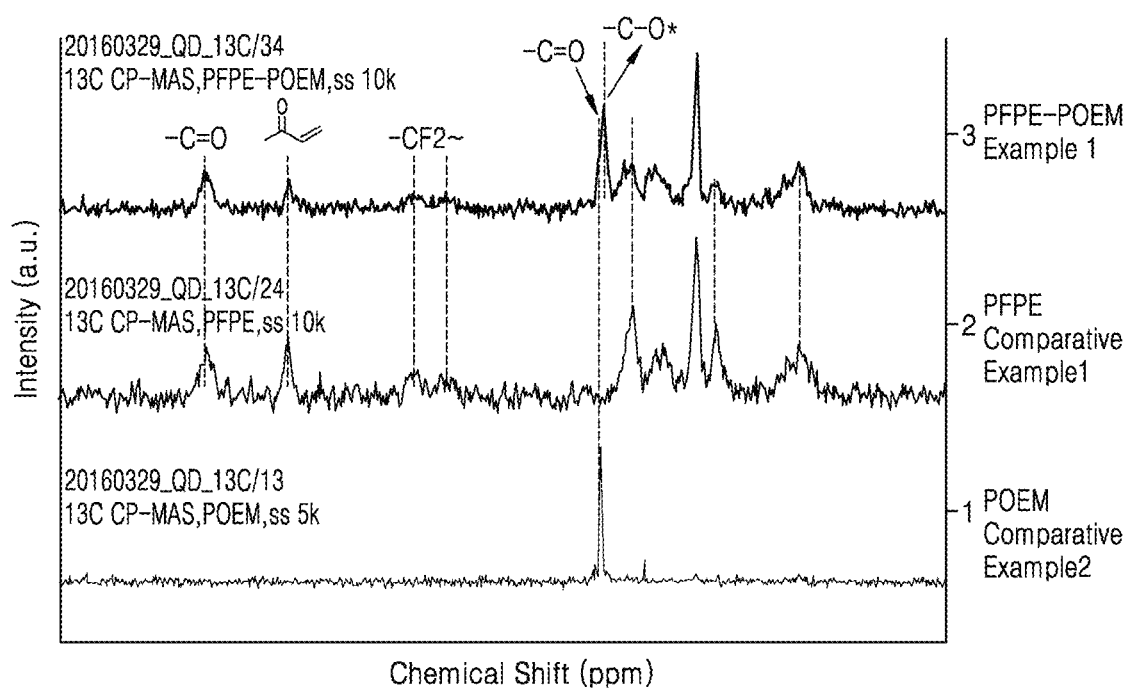
FIG. 10 is a graph of intensity (arbitrary units, a.u.) versus chemical shift (parts per million, ppm) illustrating the results of $^{13}$C-NMR spectroscopy on the polymer electrolytes of Example 1 and Comparative Examples 1 and 2.

Referring to FIG. 10, the structure of the polymer in the polymer electrolyte of Example 1 is identified.

Evaluation Example 7: Ion Conductivity Measurement

Ion conductivities of the polymer electrolytes of Examples 1 to 4 and Comparative Examples 1 and 2 were measured using an alternating impedance method as follows.

The resistances of the polymer electrolytes of Examples 1 to 4 and Comparative Examples 1 and 2 were measured by scanning in a frequency range of about 1 hertz (Hz) to 1 MHz with a voltage bias of about 10 millivolts (mV), to thereby evaluate ion conductivities of the polymer electrolytes. The results are shown in Table 2.

TABLE 2

| Example | Composition (Weight ratio of repeating units) | Thickness (μm) | Ion conductivity (mS/cm) |
| --- | --- | --- | --- |
| Example 1 | PFPE__DA/POEM (7:3) | 38 | 0.03 |
| Example 2 | PFPE__DA/PDMS (7:3) | 43 | 0.02 |
| Example 3 | PFPE__TA/POEM (6:4) | 32 | 0.02 |
| Example 4 | PFPE__TA/PDMS (6:4) | 42 | 0.03 |
| Comparative Example 1 | PTFE__DA | 84 | NA |
| Comparative Example 2 | PEOM | 37 | 0.01 |

Referring to Table 2, the polymer electrolytes of Examples 1 to 4 were found to have improved ion conductivities, compared to those of the polymer electrolytes of Comparative Examples 1 and 2.

Evaluation Example 8: Lithium Deposition Density

1) Examples 9 to 11 and Comparative Example 4

Each of the lithium metal batteries of Examples 9 to 11 and Comparative Example 4 was charged with a constant current of 0.1 C rate (0.38 milliamperes per square centimeter, mA/cm$^2$) at about 25° C. to a voltage of about 4.40 V (with respect to Li) and maintained at a constant voltage of about 4.40 V (constant voltage mode) to a cutoff current of 0.05 C rate. After this one-time charging, a change in thickness of the external pouch in each of the lithium metal batteries was measured using a micrometer. The results are shown in Table 3. The thickness of the lithium deposit layer on the lithium metal negative electrode of each of the lithium metal batteries and a thickness deviation were also measured. The results are shown in Table 3.

TABLE 3

| Example | Thickness change (μm μm) | Lithium deposition density (g/cc) |
|---|---|---|
| Example 9 | 38 | 0.27 |
| Example 10 | 41 | 0.29 |
| Example 11 | 45 | 0.26 |
| Comparative Example 4 | 68 | NA |

Referring to Table 3, the lithium metal batteries of Examples 9 to 11 were found to have a reduced change in thickness and an increased deposition density. It was impossible to operate the lithium metal battery of Comparative Example 4 and consequentially measure a thickness change and a lithium deposition density.

Evaluation Example 9: Tensile Modulus

Tensile modulus values of the polymer electrolytes of Examples 1 to 3 and Comparative Examples 1 and 2 were measured using a DMA800 (available from TA Instruments). Polymer electrolyte samples for the tensile modulus measurement were prepared according to the ASTM standard D412 (Type V specimens). The tensile modulus is also known as Young's modulus.

Variations in strain with respect to stress in each of the polymer electrolytes were measured at about 25° C., a relative humidity of about 30%, and a rate of about 5 millimeters per minute (mm/min). The measurement results are shown in Table 4.

The tensile modulus (gigapascals, GPa) was calculated from the slope of a stress-strain curve of each of the polymer electrolytes.

TABLE 4

| Example | Tensile modulus (GPa) |
|---|---|
| Example 1 | 5.0 |
| Example 2 | 1.8 |
| Example 3 | 7.2 |
| Comparative Example 1 | 12 |
| Comparative Example 2 | 0.01 |

Referring to Table 4, the polymer electrolytes of Examples 1 to 3 were found to have an improved tensile modulus, compared to the polymer electrolyte of Comparative Example 2, and were found to have good flexible characteristics.

Evaluation Example 10: Tensile Strength Measurement

Tensile strengths of the polymer electrolytes of Examples 1 to 3 and Comparative Examples 1 and 2 were measured using a DMA800 (available from TA Instruments). Polymer electrolyte samples for the tensile strength measurement were prepared according to the ASTM standard D638 (Type V specimens).

The tensile strength of each of the polymer electrolytes was measured at about 25° C., a relative humidity of about 30%, and a rate of about 5 mm/min. The tensile strength measurement results are shown in Table 5.

TABLE 5

| Example | Tensile strength (MPa) |
|---|---|
| Example 1 | 3.2 |
| Example 2 | 2.1 |

TABLE 5-continued

| Example | Tensile strength (MPa) |
|---|---|
| Example 3 | 2.8 |
| Comparative Example 1 | 3.0 |
| Comparative Example 2 | 0.7 |

Referring to Table 5, the polymer electrolytes of Examples 1 to 3 were found to have a remarkably increased tensile strength, compared to the polymer electrolyte of Comparative Example 2, and thus, were found to have high strength characteristics. The polymer electrolyte of Comparative Example 1 was also found to have a good tensile strength.

As described above, according to the one or more embodiments, a polymer electrolyte including a polymerization product of a polymer having an unsaturated functional group at a terminal thereof and a fluoroalkylene chain, and an ion-conductive polymer having an unsaturated functional group at a terminal thereof may have improved strength, improved flexibility, and improved high-voltage stability. A lithium metal battery with improved capacity retention rate may be manufactured using the polymer electrolyte.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the present disclosure as defined by the following claims.

What is claimed is:

1. A polymer electrolyte comprising a polymerization product of:
a polymer comprising an unsaturated functional group at a terminal thereof and a fluoroalkylene chain, and
an ion-conductive polymer comprising an unsaturated functional group at a terminal thereof,
wherein the polymer having an unsaturated functional group at a terminal thereof and a fluoroalkylene chain is a compound represented by Formula 3:

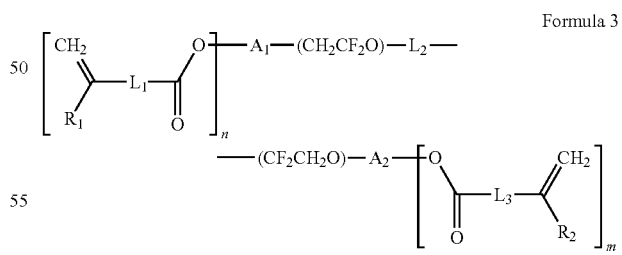

Formula 3 wherein, in Formula 3,
$L_1$ and $L_3$ are each independently a bond or —C(=O)O—R—NH—, wherein R is a divalent, trivalent or tetravalent group and selected from a C1-C20 aliphatic hydrocarbon group, a C5-C40 cycloaliphatic group, a C5-C40 cycloaliphatic urethane group, a C6-C40 aryl group, and a C2-C40 heteroaryl group,
$A_1$ and $A_2$ are each independently a bond or a divalent, trivalent or tetravalent bonding group, $L_2$ is a fluoropolyalkylene oxide chain or a perfluoropolyalkylene oxide chain, $R_1$ and $R_2$ are each independently a hydrogen or a C1-C5 alkyl group, and n and m are each independently an integer from 1 to 3;

wherein the ion-conductive polymer comprising an unsaturated functional group at a terminal thereof is a polymer represented by Formula 1 or Formula 2, Formula 1

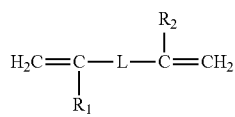

wherein, in Formula 1, $R_1$ and $R_2$ are each independently a hydrogen or a C1-C5 alkyl group, and L is one selected from groups represented by Formula 1a, Formula 1a

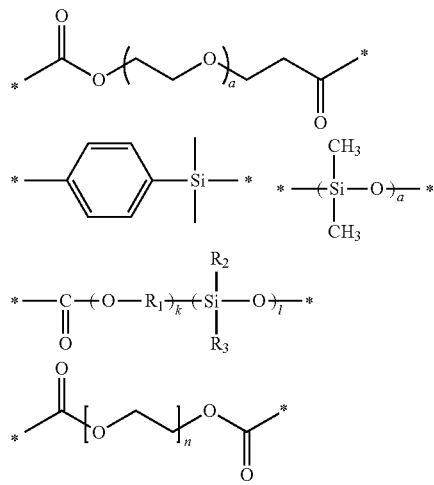

wherein, in Formula 1a, $R_1$ is a C1-C5 alkylene group, $R_2$ and $R_3$ are each independently a C1-C5 alkyl group, a is an integer from 1 to 10, k is an integer from 1 to 10, l is an integer from 1 to 10, n is an integer from 1 to 10, and

* denotes a binding site to a neighboring atom;

Formula 2

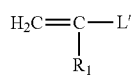

wherein, in Formula 2, $R_1$ is a hydrogen or a C1-C5 alkyl group, and

L' is one selected from groups represented by Formula 2a,

Formula 2a

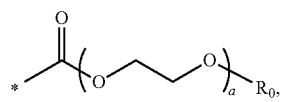

-continued

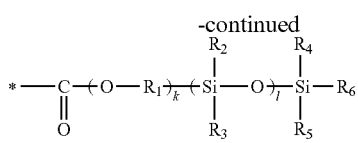

wherein, in Formula 2a, a is an integer from 1 to 10, $R_1$ is a C1-C5 alkylene group, $R_0$ and $R_2$ to $R_6$ are each independently a C1-C10 alkyl group, a C6-C10 aryl group, or a C1-C10 heteroaryl group, k is an integer from 1 to 10, l is an integer from 1 to 10, and

* denotes a binding site to a neighboring atom;

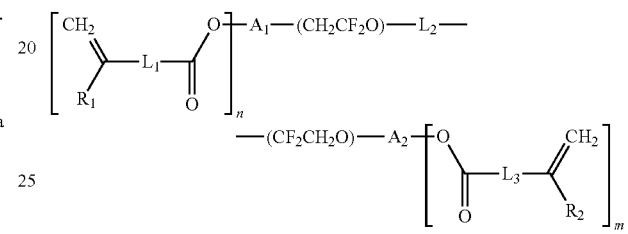

wherein the polymerization product is a compound represented by Formula 8 or a compound represented by Formula 9, Formula 8

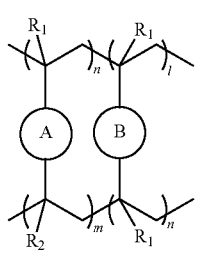

wherein, in Formula 8, l is an integer from 1 to 10, m is an integer from 1 to 10, each n is an integer from 1 to 10, $R_1$ and R are independently hydrogen or a C1-C5 alkyl group,

is a group represented by the following formula,

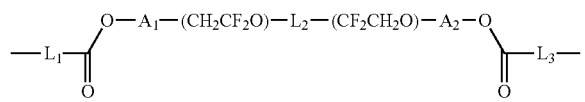

wherein, in the above formula,

L1 and L3 are each independently a bond or —C(═O)O—R—NH—, wherein R is a divalent, trivalent or tetravalent group, and selected from a C1-C20 aliphatic hydrocarbon group, a C5-C40 cycloaliphatic group, a C5-C40 cycloaliphatic urethane group, a C6-C40 aryl group, and a C2-C40 heteroaryl group, A1 and A2 are each independently a bond or a divalent, trivalent or tetravalent bonding group, L2 is a fluoropolyalkylene oxide chain or a perfluoropolyalkylene oxide chain,

Ⓑ is L, wherein L is one selected from groups represented by Formula 1a,

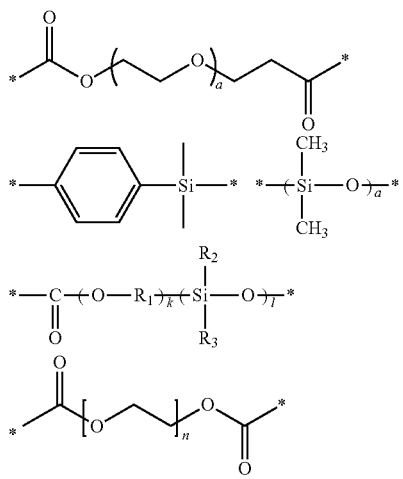

Formula 1a wherein, in Formula 1a,
R1 is a C1-05 alkylene group,
R2 and R3 are each independently a C1-C5 alkyl group,
a is an integer from 1 to 10,
k is an integer from 1 to 10,
l is an integer from 1 to 10,
n is an integer from 1 to 10, and
* denotes a binding site to a neighboring atom;

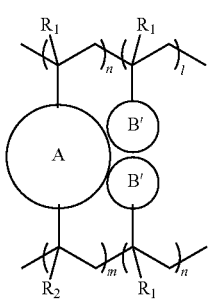

Formula 9 wherein, in Formula 9, is the same as in Formula 8, and

Ⓑ' is L', wherein L' is one selected from groups represented by Formula 2a,

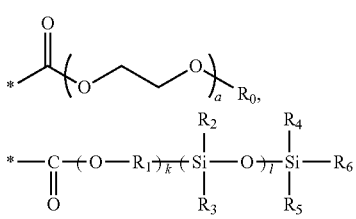

Formula 2a wherein, in Formula 2a,
a is an integer from 1 to 10,
R1 is a C1-C5 alkylene group,
R0 and R2 to R6 are each independently a C1-C10 alkyl group, a C6-C10 aryl group, or a C1-C10 heteroaryl group,
k is an integer from 1 to 10,
l is an integer from 1 to 10, and
* denotes a binding site to a neighboring atom.

2. The polymer electrolyte of claim 1, wherein an amount of the ion-conductive polymer having an unsaturated functional group at a terminal thereof is from about 0.1 part to about 50 parts by weight based on 100 parts by weight of the polymer having an unsaturated functional group at a terminal thereof and a fluoroalkylene chain.

3. The polymer electrolyte of claim 1, wherein $L_2$ in Formula 3 is a group represented by Formula 3a:

$$-(CF_2O)_p(CF_2CF_2O)_q(CFYO)_r(CF_2CFYO)_s-(CF_2(CF_2)_zCF_2O)_t-$$  Formula 3a wherein, in Formula 3a,
Y is a C1-C5 perfluoroalkyl group or a C1-C5 perfluoroalkyloxygroup,
z is 1 or 2, and
p, q, r, s, and t are each independently selected from 0 and a positive integer such that the weight average molecular weight of $L_2$ is about 500 to about 4,000 grams per mole.

4. The polymer electrolyte of claim 1, wherein $L_2$ in Formula 3 is a group represented by Formula 3b:

$$-(CF_2O)_p(CF_2CF_2O)_q-$$  Formula 3b wherein, in Formula 3b,
p and q are each independently selected from 0 and a positive integer such that the weight average molecular weight of $L_2$ is about 500 to 4,000 grams per mole.

5. The polymer electrolyte of claim 1, wherein $A_1$ and $A_2$ in Formula 3 are each a group represented by the following formula:

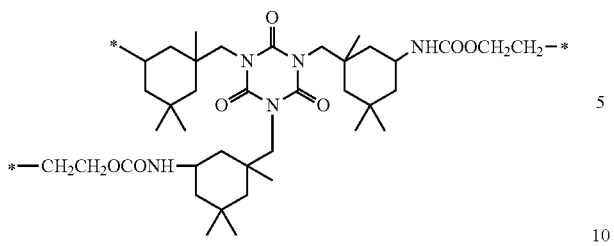

* denotes a binding site to a neighboring atom.

6. The polymer electrolyte of claim 1, wherein the compound represented by Formula 3 is a compound represented by Formula 4 or Formula 5:

Formula 4

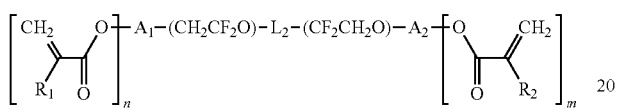

wherein, in Formula 4, $R_1$, $R_2$, $A_1$, n, m, $L_2$, and $A_2$ are the same as in Formula 3, and Formula 5

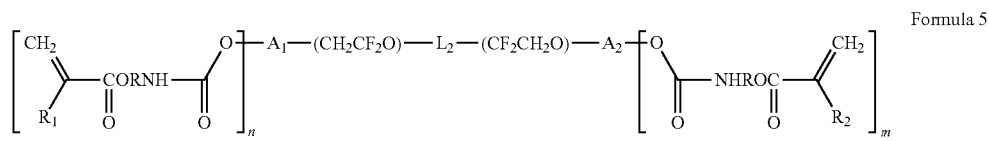

in Formula 5, $R_1$, $R_2$, Al n, m, $L_2$, and $A_2$ are the same as in Formula 3, and
R is a C1-C5 alkylene group.

7. The polymer electrolyte of claim 1, wherein the compound represented by Formula 3 is at least one selected from $H_2C=C(CH_3)COOCH_2CH_2NHCOOCH_2CF_2O(CF_2CF_2O)_{p'}(CF_2O)_{q'}CF_2CH_2OCONHCH_2C\ H_2OCOC(CH_3)=CH_2$ (wherein p' and q' are each independently selected such that the weight average molecular weight of $L_2$ is about 500 to 4,000 grams per mole), a compound represented by Formula 6, a compound represented by Formula 7, and a compound represented by Formula 17a:

Formula 6

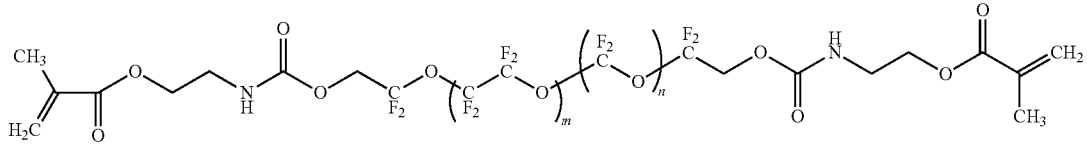

wherein, in Formula 6,
m is an integer of 1 to 5, and
n is an integer from 1 to 5, Formula 7

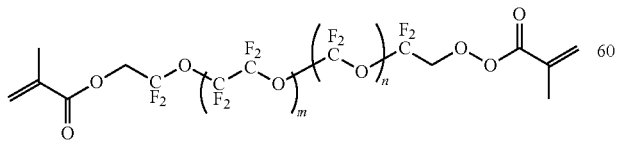

wherein, in Formula 7,
m is an integer from 1 to 5, and
n is an integer from 1 to 5, Formula 17a

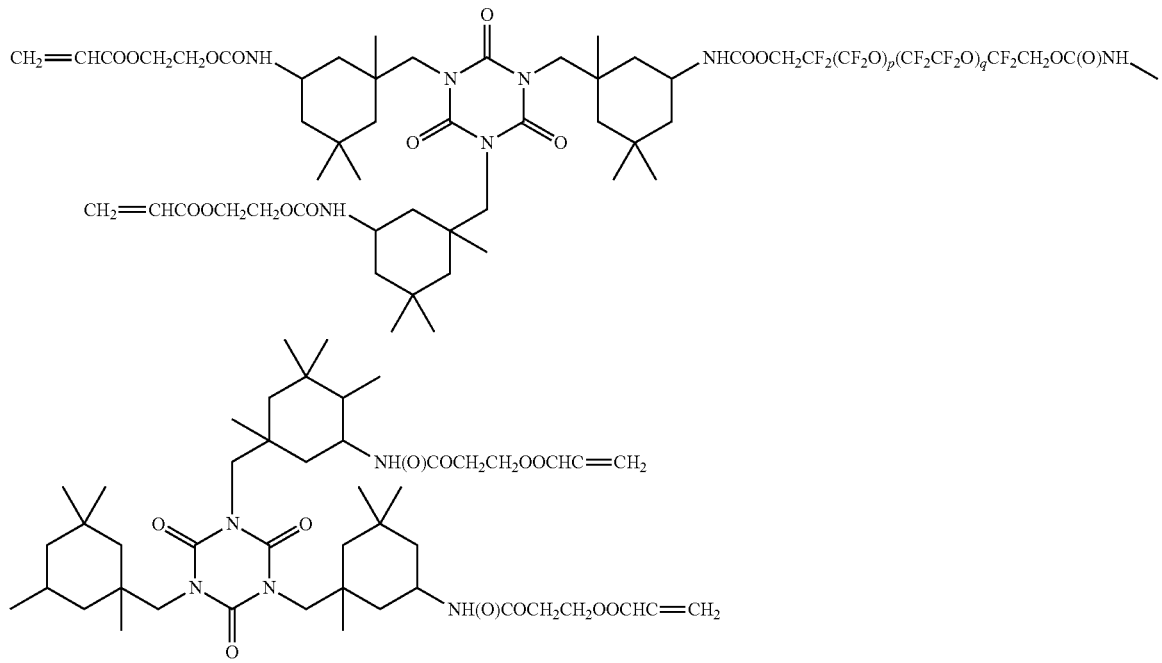

wherein, in Formula 17a, p and q are each independently selected such that the weight average molecular weight of a perfluoropolyether backbone —CF$_2$(CF$_2$O)$_p$(CF$_2$CF$_2$O)$_q$CF$_2$— is about 500 to 4,000 grams per mole.

8. The polymer electrolyte of claim 1, wherein the compound represented by Formula 1 and the compound represented by Formula 2 are each independently at least one selected from compounds represented by Formulae 15 to 19:

Formula 15

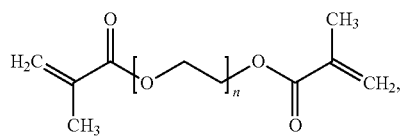

wherein, in Formula 15, n is an integer from 1 to 10,

Formula 16

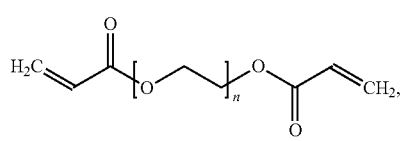

wherein, in Formula 16, n is an integer from 1 to 10,

Formula 17

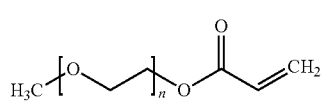

wherein, in Formula 17, n is an integer from 1 to 10,

Formula 18

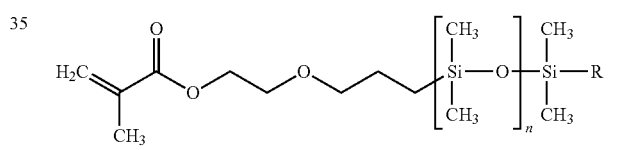

wherein, in Formula 18,
n is an integer from 1 to 10, and
R is a C1-C5 alkyl group, Formula 19

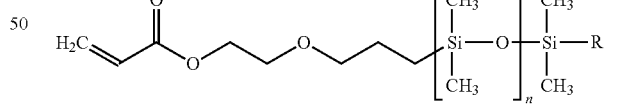

wherein, in Formula 19,
n is an integer from 1 to 10, and
R is a C1-C5 alkyl group.

9. The polymer electrolyte of claim 1, wherein, in Formulas 8 and 9, (A)

is one selected from groups represented by Formula 10:

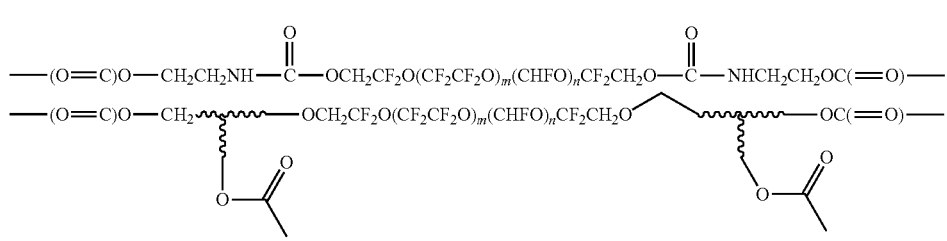

Formula 10

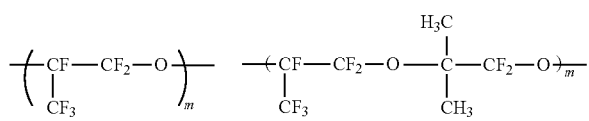

wherein, in Formula 10, a wavy-lined region is a C5-C40 cycloaliphatic urethane group, and m and n are each independently an integer from 1 to 10.

10. The polymer electrolyte of claim 1, wherein, in Formula 8,

Ⓑ is one selected from groups represented by Formula 11:

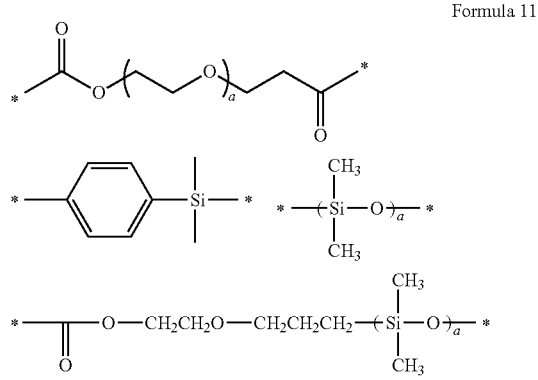

Formula 11 wherein, in Formula 11, a is an integer from 1 to 10, and

* denotes a binding site to a neighboring atom.

11. The polymer electrolyte of claim 1, wherein, in Formula 9,

Ⓑ' is one selected from groups represented by Formula 12:

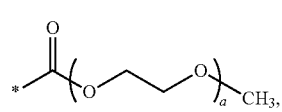

Formula 12

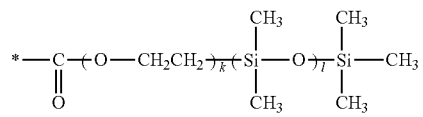

wherein, in Formula 12, a is an integer from 1 to 10,

* denotes a binding site to a neighboring atom, k is an integer from 1 to 10, and l is an integer from 1 to 10.

12. The polymer electrolyte of claim 9, wherein the C5-C40 cycloaliphatic urethane group is a group represented by the following formula:

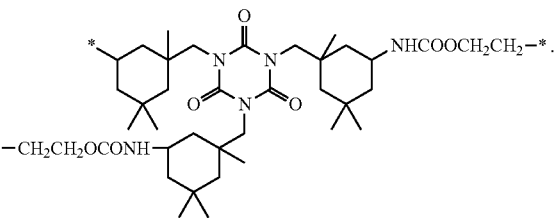

13. The polymer electrolyte of claim 1, wherein the polymerization product is a compound represented by Formula 13, a compound represented by Formula 13b, or a compound represented by Formula 14:

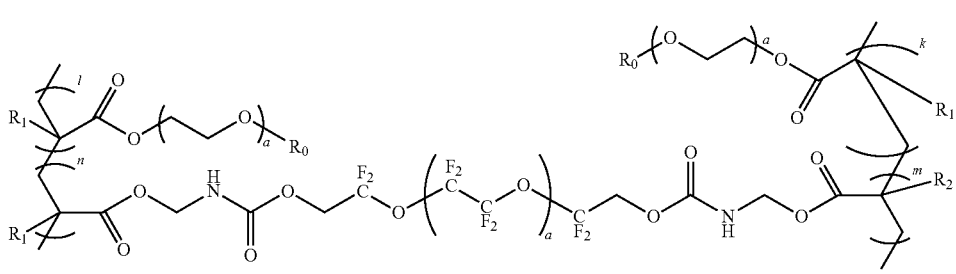

Formula 13 wherein, in Formula 13,
a is an integer from 1 to 10,
m and n are each independently an integer from 30 to 100,
l and k are each independently an integer from 50 to 100, and
$R_0$, $R_1$, and $R_2$ are each independently a hydrogen, a methyl group, an ethyl group, a propyl group, an iso-propyl group, a butyl group, or a pentyl group,

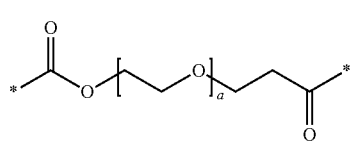

Formula 14a

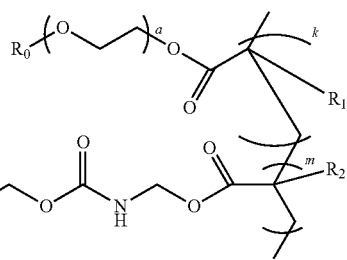

Formula 13b

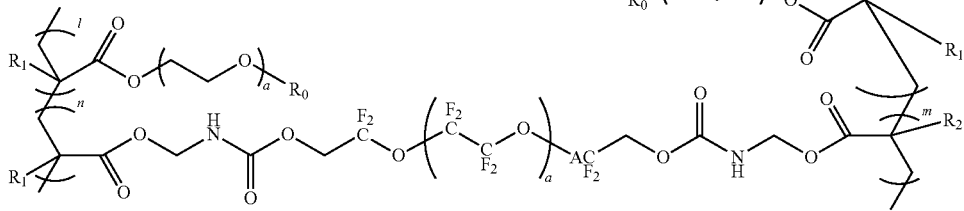

wherein, in Formula 13b,
m and n are each independently an integer from 30 to 100,
l and k are each independently an integer from 50 to 100, and
$R_0$, $R_1$, and $R_2$ are each independently a hydrogen, a methyl group, an ethyl group, a propyl group, an iso-propyl group, a butyl group, or a pentyl group,
A is —$(CF_2O)_a$—
a is an integer from 1 to 10, wherein, in Formula 14a,
a is an integer from 1 to 5, and
* denotes a binding site to a neighboring atom.

14. The polymer electrolyte of claim 1, wherein the polymer electrolyte further comprises a liquid electrolyte, and wherein a solvent impregnation ratio of the liquid electrolyte with respect to the polymerized product is about 5 percent by weight or less, wherein the solvent is at least one selected from ethylene carbonate, propylene carbonate, dimethylformamide, tetrahydrofuran, and chloroform.

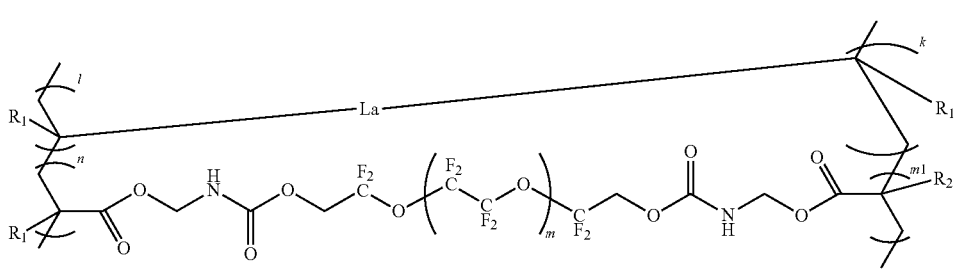

Formula 14 wherein, in Formula 14,
La is a group represented by Formula 14a,
m is an integer from 1 to 10,
$m_1$ is an integer from 30 to 100,
n is an integer from 30 to 100,
l is an integer from 50 to 100,
k is an integer from 50 to 100, and
$R_1$, and $R_2$ are each independently a hydrogen, a methyl group, an ethyl group, a propyl group, an iso-propyl group, a butyl group, or a pentyl group:

15. The polymer electrolyte of claim 1, wherein the polymer electrolyte further comprises a lithium salt.

16. The polymer electrolyte of claim 14, wherein the lithium salt is at least one selected from LiSCN, $LiN(CN)_2$, $LiClO_4$, $LiBF_4$, $LiAsF_6$, $LiPF_6$, $LiCF_3SO_3$, $Li(CF_3SO_2)_2N$, $Li(CF_3SO_2)_3C$, $Li(FSO_2)_2N$, $LiC_4F_9SO_3$, $LiN(SO_2CF_2CF_3)_2$, $LiSbF_6$, $LiPF_3(CF_2CF_3)_3$, $LiPF_3(CF_3)_3$, LiCl, LiF, LiBr, LiI, lithium difluoro(oxalato)borate and lithium bis(oxalato)borate.

17. The polymer electrolyte of claim 1, wherein the polymer electrolyte has an ion conductivity of about $10^{-6}$ siemens per centimeter or greater at about 25° C.

18. The polymer electrolyte of claim 1, wherein the polymer electrolyte has an oxidation potential of about 4.3 volts or greater and a Young's modulus of about 1 gigapascals or greater.

19. The polymer electrolyte of claim 1, wherein the polymer electrolyte further comprises at least one selected from an organic solvent, an ionic liquid, a polymer ionic liquid, and an inorganic particle.

20. A lithium metal battery comprising:
   a positive electrode;
   a negative electrode comprising a lithium metal or a lithium metal alloy; and
   the polymer electrolyte of claim 1.

21. The lithium metal battery of claim 20, wherein the lithium metal battery further comprises a lithium deposit layer on an upper surface of the negative electrode, wherein the lithium deposit layer has a deposition density of about 0.2 to 0.4 grams per cubic centimeter.

22. The lithium metal battery of claim 20, wherein the lithium metal battery has a driving voltage of about 4 volts or greater.

23. A method of preparing a polymer electrolyte of any one of claims 1 to 19, the method comprising:
   polymerizing a mixture of a polymer comprising an unsaturated functional group at a terminal thereof and a fluoroalkylene chain, and an ion-conductive polymer comprising an unsaturated functional group at a terminal thereof, wherein the ion-conductive polymer comprising an unsaturated functional group at a terminal thereof is a polymer represented by Formula 1 or Formula 2, and wherein the polymer comprising an unsaturated functional group at a terminal thereof and a fluoroalkylene chain is a compound represented by Formula 3:

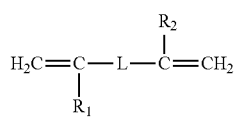

Formula 1 wherein, in Formula 1,
$R_1$ and $R_2$ are each independently a hydrogen or a C1-C5 alkyl group, and
L is one selected from groups represented by Formula 1a,

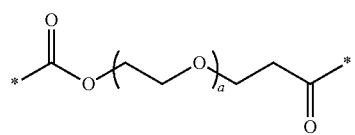

Formula 1a

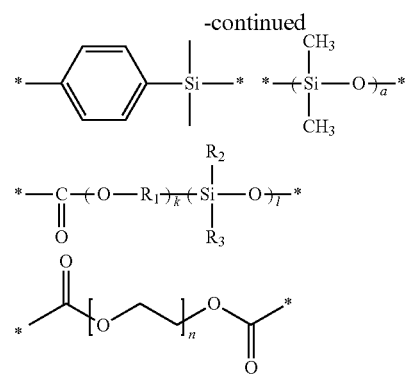

-continued wherein, in Formula 1a,
$R_1$ is a C1-C5 alkylene group,
$R_2$ and $R_3$ are each independently a C1-C5 alkyl group,
a is an integer from 1 to 10,
k is an integer from 1 to 10,
l is an integer from 1 to 10,
n is an integer from 1 to 10, and
indicates denotes a binding site to a neighboring atom,

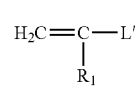

Formula 2 wherein, in Formula 2,
$R_1$ is a hydrogen or a C1-C5 alkyl group, and
L' is one selected from groups represented by Formula 2a,

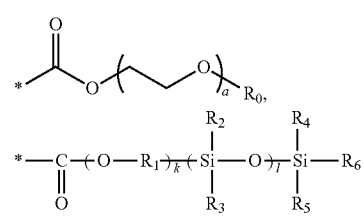

Formula 2a wherein, in Formula 2a,
a is an integer from 1 to 10,
$R_1$ is a C1-C5 alkylene group,
$R_0$, and $R_2$ to $R_6$ are each independently a C1-C10 alkyl group, a C6-C10 aryl group, or a C1-C10 heteroaryl group,
k is an integer from 1 to 10,
l is an integer from 1 to 10, and
* denotes a binding site to a neighboring atom,

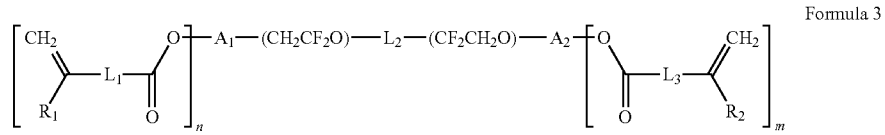

Formula 3 wherein, in Formula 3,

L₁ and L₃ are each independently a bond or —C(=O)O—R—NH—, wherein R is a divalent, trivalent or tetravalent group and selected from a C1-C20 aliphatic hydrocarbon group, a C5-C40 cycloaliphatic group, a C5-C40 cycloaliphatic urethane group, a C6-C40 aryl group, and a C2-C40 heteroaryl group, $A_1$ and $A_2$ are each independently a bond or a divalent, trivalent or tetravalent bonding group, $L_2$ is a fluoropolyalkylene oxide chain or a perfluoropolyalkylene oxide chain, $R_1$ and $R_2$ are each independently a hydrogen or a C1-C5 alkyl group, and n and m are each independently an integer from 1 to 3.

24. A polymer electrolyte comprising a polymerization product of:
a polymer comprising an unsaturated functional group at a terminal thereof and a fluoroalkylene chain, and
an ion-conductive polymer comprising an unsaturated functional group at a terminal thereof,
wherein the polymer having an unsaturated functional group at a terminal thereof and a fluoroalkylene chain is a compound represented by Formula 3:

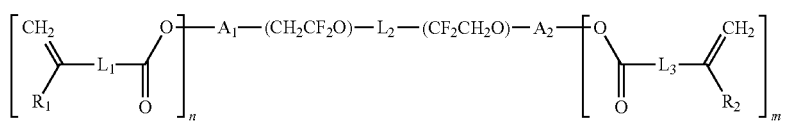

Formula 3 wherein, in Formula 3, $L_1$ and $L_3$ are each independently a bond or —C(=O)O—R—NH—, wherein R is a divalent, trivalent or tetravalent group and selected from a C1-C20 aliphatic hydrocarbon group, a C5-C40 cycloaliphatic group, a C5-C40 cycloaliphatic urethane group, a C6-C40 aryl group, and a C2-C40 heteroaryl group, $A_1$ and $A_2$ are each independently a bond or a divalent, trivalent or tetravalent bonding group, and $A_1$ and $A_2$ in Formula 3 are each independently a C5-C40 cycloaliphatic urethane group, $L_2$ is a fluoropolyalkylene oxide chain or a perfluoropolyalkylene oxide chain, $R_1$ and $R_2$ are each independently a hydrogen or a C1-C5 alkyl group, and n and m are each independently an integer from 1 to 3;

wherein the ion-conductive polymer comprising an unsaturated functional group at a terminal thereof is a polymer represented by Formula 1 or Formula 2,

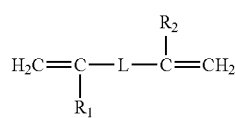

Formula 1 wherein, in Formula 1, $R_1$ and $R_2$ are each independently a hydrogen or a C1-C5 alkyl group, and L is one selected from groups represented by Formula 1a,

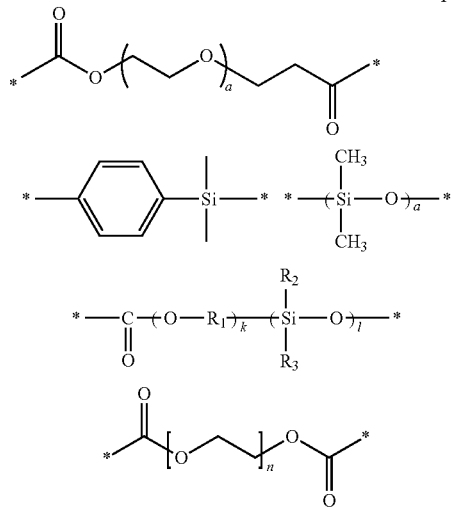

Formula 1a wherein, in Formula 1a, $R_1$ is a C1-C5 alkylene group, $R_2$ and $R_3$ are each independently a C1-C5 alkyl group, a is an integer from 1 to 10, k is an integer from 1 to 10, l is an integer from 1 to 10, n is an integer from 1 to 10, and

* denotes a binding site to a neighboring atom,

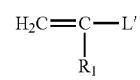

Formula 2 wherein, in Formula 2, $R_1$ is a hydrogen or a C1-C5 alkyl group, and

L' is one selected from groups represented by Formula 2a,

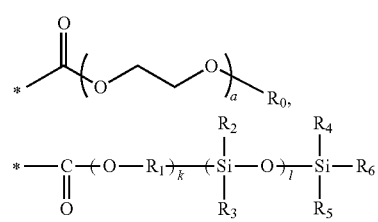

Formula 2a wherein, in Formula 2a, a is an integer from 1 to 10, $R_1$ is a C1-C5 alkylene group, $R_0$ and $R_2$ to $R_6$ are each independently a C1-C10 alkyl group, a C6-C10 aryl group, or a C1-C10 heteroaryl group, k is an integer from 1 to 10, l is an integer from 1 to 10, and

* denotes a binding site to a neighboring atom.

* * * * *